United States Patent
Heikkinen et al.

(10) Patent No.: US 12,273,403 B2
(45) Date of Patent: Apr. 8, 2025

(54) SELECTION OF CDN AND ACCESS NETWORK ON THE USER DEVICE FROM AMONG MULTIPLE ACCESS NETWORKS AND CDNS

(71) Applicant: Adeia Guides Inc., San Jose, CA (US)

(72) Inventors: Antti Heikkinen, Oulu (FI); Mikko Uitto, Tyrnävä (FI)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/599,479

(22) Filed: Mar. 8, 2024

(65) Prior Publication Data

US 2024/0348674 A1  Oct. 17, 2024

Related U.S. Application Data

(63) Continuation of application No. 18/127,968, filed on Mar. 29, 2023, now Pat. No. 11,956,293.

(51) Int. Cl.
| | |
|---|---|
| *G06F 13/00* | (2006.01) |
| *H04L 65/61* | (2022.01) |
| *H04L 65/80* | (2022.01) |
| *H04W 48/18* | (2009.01) |

(52) U.S. Cl.
CPC .............. *H04L 65/61* (2022.05); *H04L 65/80* (2013.01); *H04W 48/18* (2013.01)

(58) Field of Classification Search
CPC ......... H04L 65/61; H04L 65/80; H04W 48/18
USPC ................. 709/231, 217–219, 238, 250, 249
See application file for complete search history.

(56) References Cited

U.S. PATENT DOCUMENTS

| | | | |
|---|---|---|---|
| 8,719,399 B2 * | 5/2014 | Harrang | H04L 1/0038 709/224 |
| 9,548,874 B2 | 1/2017 | Joe et al. | |
| 10,104,602 B2 | 10/2018 | Popiel et al. | |
| 10,523,732 B2 | 12/2019 | Watson et al. | |
| 10,904,096 B2 * | 1/2021 | Nataraj | H04L 47/115 |
| 11,343,300 B2 | 5/2022 | Srinivasan et al. | |
| 11,658,915 B2 * | 5/2023 | Ibrahim | H04W 72/30 709/233 |
| 11,936,710 B1 * | 3/2024 | Heikkinen | H04N 21/2401 |
| 11,936,711 B1 * | 3/2024 | Heikkinen | H04L 65/752 |
| 11,956,293 B1 | 4/2024 | Heikkinen et al. | |
| 11,968,128 B2 * | 4/2024 | Ibrahim | H04N 21/26216 |
| 2006/0072583 A1 | 4/2006 | Sanda et al. | |
| 2006/0274760 A1 | 12/2006 | Loher | |
| 2009/0024634 A1 * | 1/2009 | Harrang | G06F 3/1454 |
| 2013/0156119 A1 | 6/2013 | Poulin | |

(Continued)

OTHER PUBLICATIONS

Adhikari et al., "Measurement study of NetFlix Hulu and a tale of three CDNs", IEEE/ACM Trans. Netw., 23(6):1984-1997 (2015).

(Continued)

*Primary Examiner* — Kenneth R Coulter
(74) *Attorney, Agent, or Firm* — Haley Guiliano LLP

(57) ABSTRACT

Systems and methods for the selection of a network interface/CDN pair from among multiple network interface/CDN pairs are provided. In an embodiment, a method includes retrieving information about sets of CDNs accessible via different network interfaces of a device. A plurality of network interface/CDN pairs are then identified, and performance metrics for each pair are measured. A best pair is selected, and is used to retrieve the next segments of a requested content item.

20 Claims, 16 Drawing Sheets

(56) References Cited

U.S. PATENT DOCUMENTS

| | | | |
|---|---|---|---|
| 2017/0134253 A1 | 5/2017 | Wang | |
| 2018/0103423 A1 | 4/2018 | Popiel et al. | |
| 2019/0089772 A1 | 3/2019 | Gavade et al. | |
| 2019/0215361 A1 | 7/2019 | Lohmar et al. | |
| 2020/0204448 A1* | 6/2020 | Nataraj | H04L 41/046 |
| 2020/0413111 A1* | 12/2020 | Varadarajan | H04N 21/2385 |
| 2022/0030308 A1 | 1/2022 | Bentaleb et al. | |

OTHER PUBLICATIONS

Adhikari et al., "Unreeling Netflix: Understanding and improving multi-CDN movie delivery," 2012 Proceedings IEEE INFOCOM, 1620-1628 (2012).

Bottger et al., "Open connect everywhere: A glimpse at the Internet ecosystem through the lens of the NetFlix CDN," ACM SIGCOMM Comput. Commun. Rev., 48(1):28-34 (2018).

ISO/IEC 23009-1:2014: Information technology—Dynamic adaptive streaming over HTTP (DASH)—Part 1: "Media presentation description and segment formats" (15 pages).

Pantos, "HTTP Live Streaming 2nd Edition". IETF Draft, [retrieved on Apr. 25, 2023 from URL: https://datatracker.ietf.org/doc/draft-pantos-hls-rfc8216bis/] (73 pages).

Sodagar, "The MPEG-DASH Standard for Multimedia Streaming Over the Internet," IEEE MultiMedia, 18(4):62-67 (2011).

Viola et al., "MEC Proxy for Efficient Cache and Reliable Multi-CDN Video Distribution," 2018 IEEE International Symposium on Broadband Multimedia Systems nd Broadcasting (BMSB), pp. 1-7 (2018).

Viola et al., "Predictive CDN Selection for Video Delivery Based on LSTM Network Performance Forecasts and Cost-Effective Trade-Offs," IEEE Transactions on Broadcasting, vol. 67(1):145-158 (2021).

Yang et al., "SSMP: Server Selection for Multipath TCP in CDN Environments," Globecom 2020—2020 IEEE Global Communications Conference (2020) (6 pages).

Zhu et al., "User Mapping Strategy in Multi-CDN Streaming: A Data-Driven Approach," IEEE Internet of Things Journal, 9(9):6638-6649 (2022).

\* cited by examiner

SELECTION OF CDN AND ACCESS NETWORK ON THE USER DEVICE FROM AMONG MULTIPLE ACCESS NETWORKS AND CDNS

CROSS-REFERENCE TO RELATED APPLICATIONS

This application is a continuation of U.S. patent application Ser. No. 18/127,968, now U.S. Pat. No. 11,956,293, filed Mar. 29, 2023, the disclosure of which is hereby incorporated by reference herein in its entirety.

BACKGROUND OF THE INVENTION

One or more embodiments of the present disclosure relate to methods and systems for selecting a network interface/content delivery network (CDN) pair to receive segments of a media content item, and more particularly, enabling switching from one pair to another based on performance of the pairs over time. Some embodiments or aspects may relate to other features, functionalities, or fields.

SUMMARY

Content distributors can use multiple CDNs to distribute their content to user devices. The architecture of a CDN may consist of interconnected PoPs (Points of Presence), which are local caching servers (edge servers) that may be distributed throughout the world. The PoPs are either connected directly to the content server (e.g., origin of the media content) or to a mid-layer cache. PoPs may be connected to Internet exchange points, or may be directly connected to the Internet service provider (ISP) network. CDNs may cache media segments from the content server (e.g., origin) to edge servers. A CDN may utilize a server selection algorithm to return each user with content requests for an optimal server. This server selection algorithm has an impact on the Quality of Service (QOS).

The use of multiple CDNs may increase capacity, availability, and reliability compared to the use of a single CDN. Each CDN in a multi-CDN system may include identical content, or may include different content and/or different variants or representations of content (e.g., different bit rates or resolutions of the same content item). Content distributors may prefer different CDNs to be accessible via different access networks, and/or may prefer certain CDNs to distribute premium or high-quality content. Thus, two CDNs associated with the same content distributor may store different content.

Consumers have user devices such as computers, televisions, and phones that can access CDNs via network interfaces to request and retrieve stored content (e.g., movies, tv shows, etc.). These user devices may have multiple network interfaces, enabling connections to, for example, a wi-fi network and a cellular network at the same time. User devices may also operate using HTTP Adaptive Streaming (HAS) specifications such as MPEG-DASH and HLS, which support usage of multiple CDNs. MPEG-DASH, for example, allows multiple BaseURLs to be defined in the Media Presentation Description (MPD). Each CDN corresponds to one BaseURL, which in some cases points to an identical content source (e.g., http://cdn1.example.com/ and http://cdn2.example.com/). HLS, for example, allows the use of redundant variant streams with a different URL in the manifest. A variant stream is redundant if it has the exact same EXT-X-STREAM-INF tag as the original one.

Several problems may arise when a media application running on the user device streams content using a wi-fi network or a cellular network. First, the connectivity of the access network used to retrieve segments of the streamed content may vary over time, and the CDN/network connections may encounter congestion or other performance issues. Second, the user device may be limited to accessing only those CDNs available via a single network interface (e.g., the wi-fi interface). If other CDNs are available via a different network interface (e.g., the cellular interface), they may be inaccessible to the user device. Third, limiting the accessible CDNs may result in limited content quality available to the user. Each CDN may store different content or representations of the content (e.g., different resolutions), and some high quality content may be inaccessible via one or more network connections. Fourth, limiting the accessible CDNs may result in poor performance and a poor user experience. The network and/or CDNs accessible via the network may become congested and/or may have other performance issues. Additionally, the CDNs available via the network may include non-optimal CDNs for the user, such as CDNs in a non-optimal location.

With these issues in mind, embodiments of the present disclosure provide an ability for a user device to switch between CDNs, switch between access networks and/or network interfaces used to access the CDNs, switch between pairs of network interfaces and CDNs, and switch between pairs of networks and CDNs (even if the network interface remains the same).

Throughout this disclosure, various embodiments may refer to network interface/CDN pairs, performance of network interface/CDN pairs, and switching between different network interface/CDN pairs. However, it should be appreciated that the functions, features, and benefits described with respect to these network interface/CDN pairs may also apply to access network/CDN pairs as well. That is, where this disclosure refers to a "network interface/CDN pair," the term "network/CDN pair" may be inserted as well. That is, in some embodiments, the "network interface" or "interface" may be understood as a proxy for the "access network" or "network." Thus, while embodiments may be described herein as referring to pairs of networks and CDNs, they may also or alternatively be understood as referring to pairs of network interfaces and CDNs. "Network" and "network interface" in the context of this disclosure may each refer to the route through which a user device accesses a particular CDN.

In an example, the user device may include a selection application that determines the best network interface/CDN pair or network/CDN pair to provide segments of requested media content to the user device. When a user wants to view a content item (e.g., a movie or TV show), the user device, via the selection application, receives information identifying a first set of CDNs accessible via a first network interface of the user device, and a second set of CDNs accessible via a second network interface of the user device. The user device then identifies all the possible network interface/CDN pairs through which segments of the requested content item can be retrieved for playback by the user device. The device also determines various performance metrics for each pair, in order to determine the pair with the best or optimal performance. The device then requests the segments of the content item via the determined best pair.

When the performance of the best pair degrades, the user device can switch to a different network interface/CDN pair or network/CDN pair. For example, the user device may (a) switch to a different CDN accessible via the same network or network interface, (b) remain using the same CDN but access the CDN via a different network or network interface, or (c) switch to a different CDN and a different network or network interface. In each of these cases, the user device may make a client-side determination to switch from one CDN, network, or network interface to another based on performance information for each network interface/CDN pair or network/CDN pair. Alternatively, the user device may transmit performance data to a server (e.g., the origin server) which may make a determination whether the user device should switch CDNs, networks, or network interfaces, and to what CDN, network, or network interface to switch.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are provided herein for selecting CDNs, access networks, and network interfaces from among multiple CDNs, access networks, and network interfaces.

In one example, a network interface/CDN selection application ("selection application" or simply "application") operates with a user device or user equipment (UE) to select a network interface of the user device and a CDN from which segments of a content item should be retrieved and played by a media player of the user device. The selection application downloads manifest files via each available access network, compares the manifest files, downloads media content from available CDNs listed in the manifest files using the available access networks, and measures the transfer quality for each network interface/CDN pair using one or more performance metrics. Using these performance metrics, the selection application may propose from which CDN and network interface or access network the next segments of the content item should be retrieved to provide the user with an optimal experience (i.e., high quality video with no buffering issues). The selection application may propose either a single network interface/CDN pair, or multiple pairs if more than one access network or CDN if the user device and CDNs allow for multipath protocols. In addition, the selection application may propose to switch to another network interface/CDN pair (or network/CDN pair) under some circumstances, for instance due to CDN failure or outage or due to access network connectivity degradation.

Figure 1A:
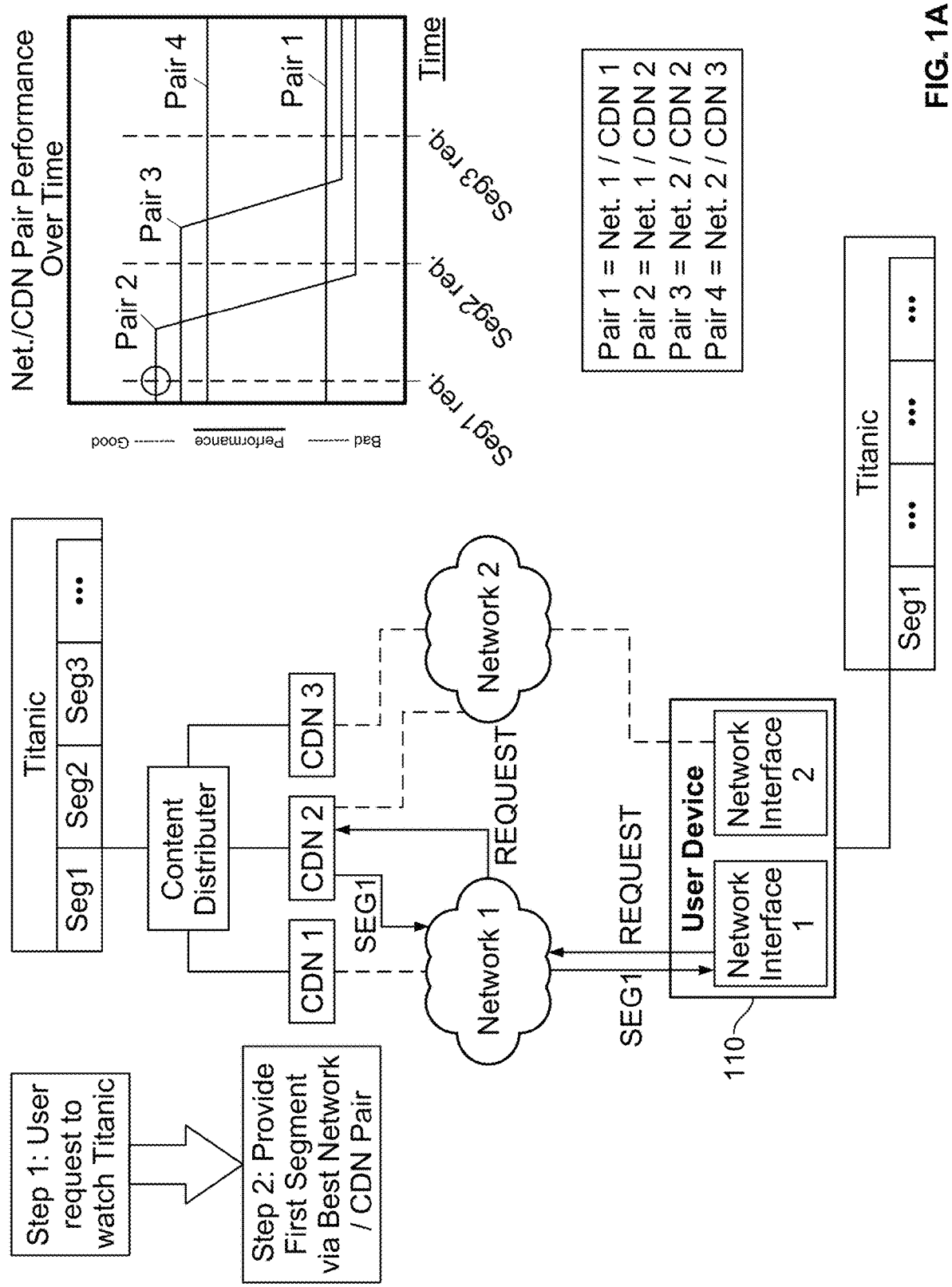
FIGS. 1A, 1B, and 1C show example simplified diagrams of a user device requesting and receiving segments of a content item, and how the network interface/CDN pair used to retrieve the segments changes over time as the pairs' performances change.
Figure 1B:
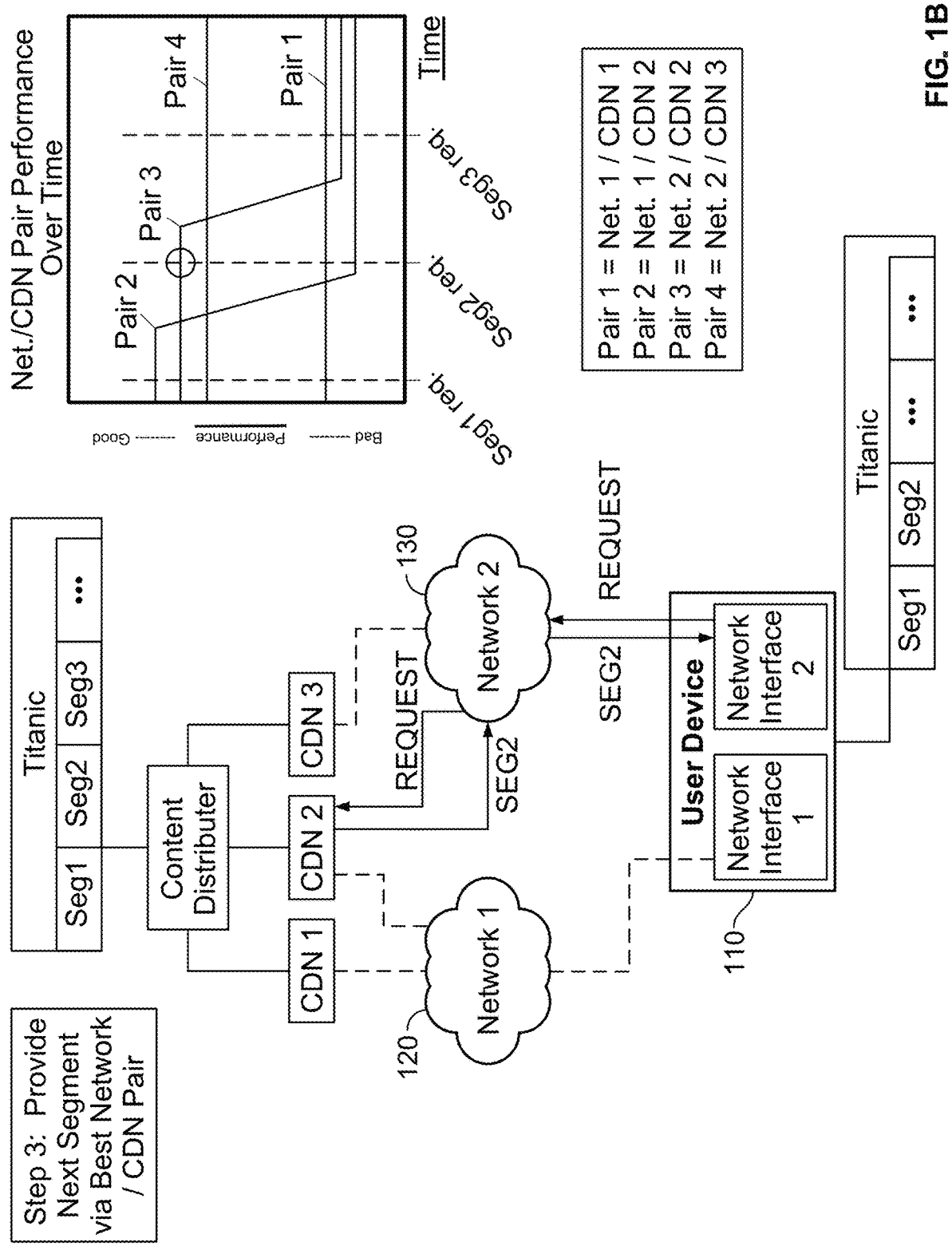
Figure 1C:
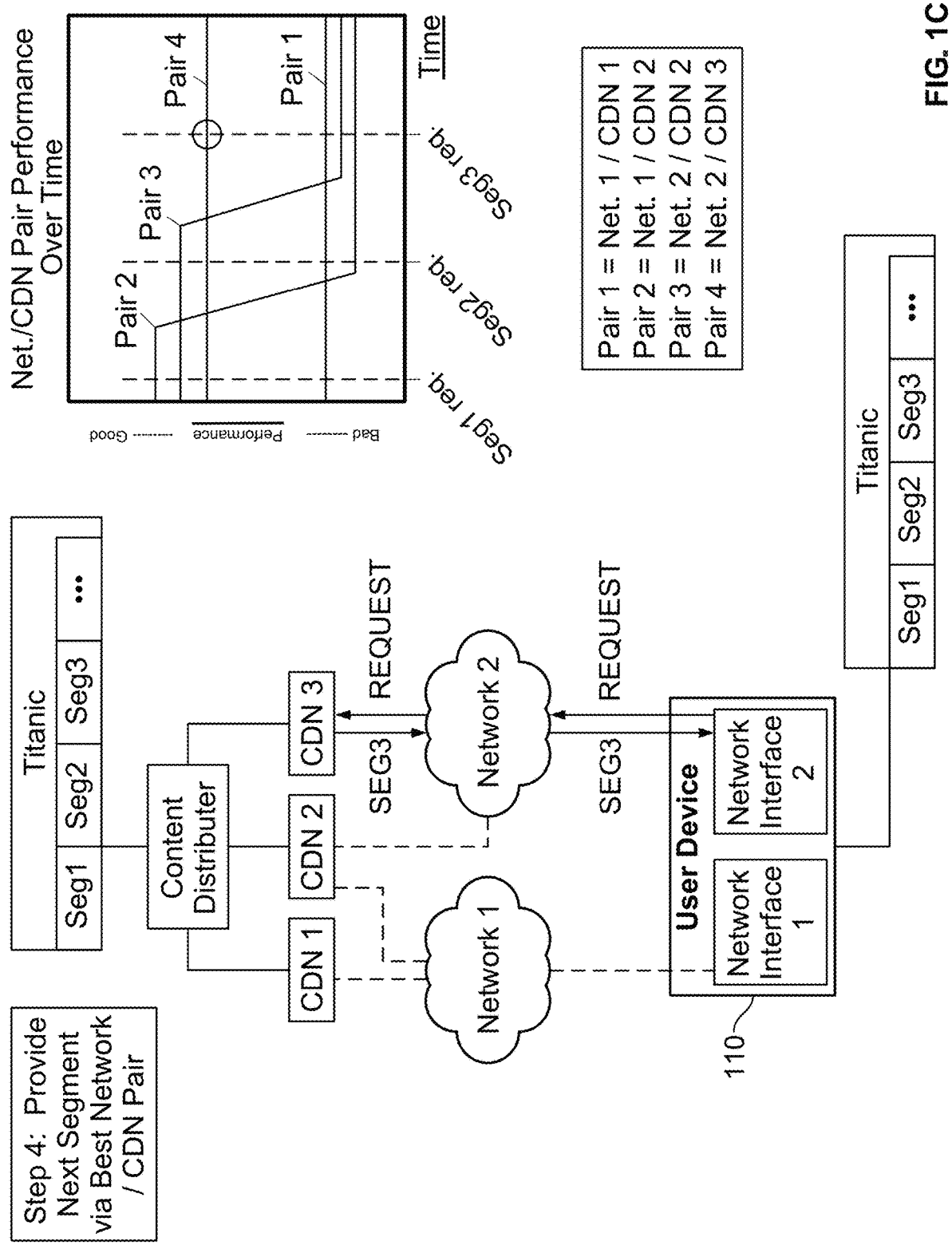

FIGS. 1A, 1B, and 1C illustrate a series of example diagrams showing how segments of a content item are retrieved by a user device based on the procedures and concepts disclosed herein. As time progresses and the performance of the network/CDN pairs changes, the optimal pair via which to obtain subsequent segments of the content item changes.

As an initial step in this example, a user may request to watch the movie Titanic on their user device 110. Once that request is made, the system determines that network interface/CDN pair 2, comprising network interface 1 and CDN 2, is the best pair for retrieving the first segment of Titanic. This determination is discussed in greater detail below with respect to FIGS. 3-5.

In response to the determination that pair 2 is the best pair, the user device 110 requests segment 1 of Titanic using pair 2, and receives segment 1 for display to the user.

As time passes, one or more pairs may experience improved or degraded performance. The user device monitors the performance of each pair, and makes a determination to switch pairs when performance of the currently active pair degrades. FIG. 1A shows that pair 2 is the best pair when the request for segment 1 is made. As time progresses and pair 2's performance degrades, pair 3 becomes the best performing pair. FIG. 1B shows that when the user device requests the second segment of Titanic, pair 3 is the best performing pair. As such, the user device requests the segment 2 via pair 3, which comprises network interface 2 and CDN 2.

As time continues to progress, performance of pair 3 may degrade as well. As shown in FIG. 1C, when the user device requests the segment 3, pair 4 is the best performing pair. As such, the user device requests segment 3 via pair 4, which comprises network interface 2 and CDN 3. The user device continues to monitor the performance of each available network interface/CDN pair, enabling the user device to request the next segment of the content item from the current best pair at any given time. This process is described in further detail below.

Figure 2:
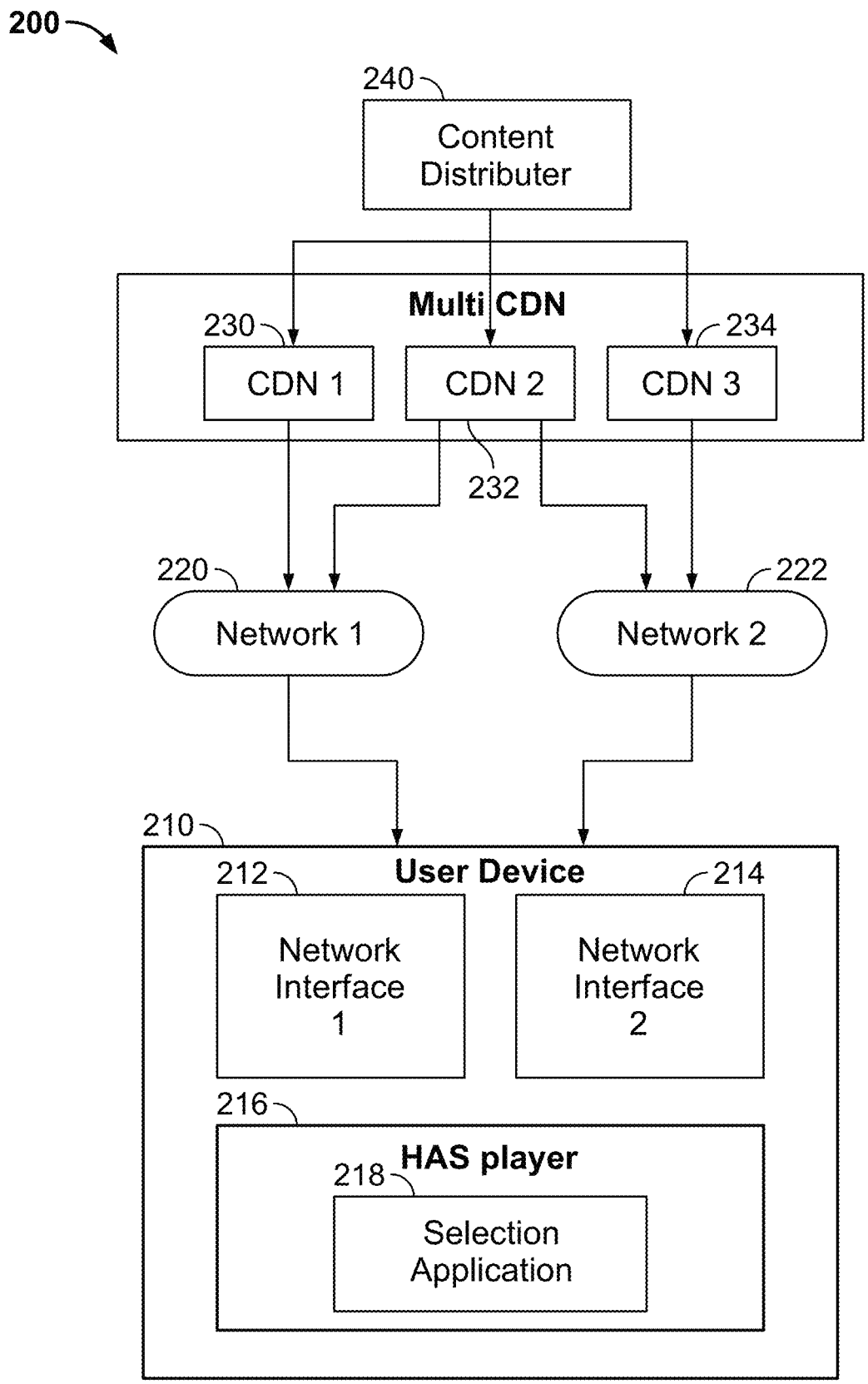
FIG. 2 shows a simplified block diagram of an example system, in accordance with some embodiments of this disclosure.

FIG. 2 illustrates a simplified block diagram of an example system 200, in accordance with some embodiments of this disclosure. The system 200 can be used to enable user device 210 to access segments of content items via one or more access networks 220 and 222 and network interfaces 212 and 214. While FIG. 2 illustrates a user device having two network interface 212 and 214, it should be appreciated than any number of network interfaces may be used. Additionally, each network interface 212 and 214 is coupled to a single network 220 or 222. It should also be appreciated that one or more network interfaces may be coupled to one, two, or more access networks.

The system 200 includes a content distributor 240, which provides the content item to the CDNs 230, 232, and 234 of the multi-CDN system to distribute the content item to various user devices. In some examples, the content distributor 240 may set certain rules or policies regarding which CDN of the multi-CDN system a given user device should use in a given situation. In some examples, the CDN or CDNs accessible to a user device are selected based on an internet service provider (ISP) or access network. In the illustrated example of FIG. 2, CDN 1 (230) and CDN 2 (232) are accessible via network 1 (220) and CDN 2 (232) and CDN 3 (234) are accessible via network 2 (222). Other combinations are possible as well, including having one, three, or more CDNs accessible via a given network.

In the illustrated example, the user device 210 includes first and second network interfaces 212 and 214 which correspond to access networks 220 and 222. In some examples, a single network interface may be used to connect to two or more access networks. Additionally, in some examples the user device 210 may connect to multiple access networks simultaneously via one or more network interfaces. In the illustrated example of FIG. 2, the user device has two network interfaces 212 and 214. If the user device requests a manifest file from network 1 (220) it will receive a manifest with URLs (BaseURL in MPD) pointing to CDN 1 (230) and CDN 2 (232). If the user device requests a manifest file from network 2 (222) it will receive a manifest with URLs (BaseURL in MPD) pointing to CDN 2 (232) and CDN 3 (234).

In some examples, the user device also includes an HTTP Adaptive streaming (HAS) player 216, and a network interface/CDN selection application 218. The HAS player 216 may be referred to as the "media player," and may be another type of media player configured to play media received from a CDN (e.g., MPEG-DASH, apple-HLS, etc.).

The network interface/CDN selection application 218 may propose either a single network interface/CDN pair or multiple pairs if more than one access networks or CDNs are able to be used concurrently, such as if multipath protocols are enabled at the user device and the CDNs. The selection application 218 may assist the HAS player 216 to select a network interface/CDN pair if the HAS player uses one network interface for media streaming, or to select a CDN for each available network interface or access network when multiple network interfaces or networks are used and to recommend a ratio between the multiple network interfaces or networks to request the segments of the content item. In addition, the selection application may propose to switch to another access network/CDN pair due to CDN failure/outage or due to access network connectivity degradation. Alternatively, the origin server (or another server, not the user device) can make a determination that the user device should switch to a different network interface, network, or CDN. This "server side" determination can be done in some examples if all these aspects are fulfilled: (1) the participating user device provides information about their available network interfaces to the server, (2) the participating user device provides near real-time network performance information from the content fetching from the CDNs, and (3) there is specific signaling between the server-side logic and the user device. This additional specific signaling may increases the number of overhead flows and may lead to a more complex system than doing it in the client side, but may offload some decision-making from the user device to the server. This offloading may also enable the server to optimize the CDN and network usage for multiple user devices, thereby improving performance for all devices.

In some examples, CDN selection or switching can be made on the server side. Server side CDN selection delivers information to the user device about where (i.e., from which CDN) media content can be retrieved. The user device does not make any decision itself but uses the URLs to fetch each media segment as directed. In server side CDN selection, the user device may be unaware of other CDNs and access networks, but uses the given URLs as directed. Some techniques for server side CDN selection are DNS based selection and manifest file rewrite. In a simple DNS based selection, a DNS-server directs the user device to the CDN based on the static rules e.g., traffic volume, client IP address, client device type, CDN price, or QoS metrics. Other DNS based selection are based on dynamic DNS-logic and allow user specific decisions. A selection system or component in the network may perform the CDN selection. The CDN selection can be done by rewriting the manifest file in real-time. When the media player requests a manifest file, the selection system or proxy server in the network will get the original manifest and rewrite the selected CDN URL to it and send it to the media player. Some examples include a selecting apparatus located in the network to select a CDN entity for delivering content to a client device out of a set of CDN entities. In another example, a server-side system to select the target CDN includes selection based on information provided by the user device and CDN selection policies. In another example, a server-side machine learning-based data-driven approach to mapping users in multi-CDN video delivery systems is used. In a further example, a media server with a forecast service is used so that metrics collected by the media player of a user device are processed at the server, and the server can update the MPD to redirect the media player to another CDN. In another example, a proxy in the MEC server that selects an alternative CDN based on live connectivity statistics is used. For server side determinations, the information that the user device may use more than one network or network interface to retrieve content from CDNs is not available at the server side.

Alternatively, client side CDN selection can be performed by the user device. In some examples, the user device receives information about available CDNs, for instance from a manifest file, and determines a suitable CDN based on the real-time performance metric information. In a manifest-based switching example, the MPEG-DASH or HLS media player determines CDN information in the manifest file and selects the desired CDN based on that information. In other examples, more advanced CDN selection may be based on the local quality of service (QOS) or quality of experience (QoE) data. In some examples, both server-side and client-side CDN selection can be used together, such as when the server selects for instance two CDNs and the client selects the optimal one of the two CDNs. In some examples, a CDN selection device is used at the client side to receive information from the CDNs related to an availability of content or a capability of the multiple CDNs to provide the content. The user device can select which CDN to receive the content from based on the received information and capability of the CDN. In other examples, a CDN switching application at the user device can be utilized to perform adaptive CDN switching. The CDN switching application directs the media player of the user device to receive content from a first CDN, sets a minimum performance threshold based on the playback variables of the received content, and retrieves new content from a second CDN if the minimum performance threshold is not met.

Figure 7:
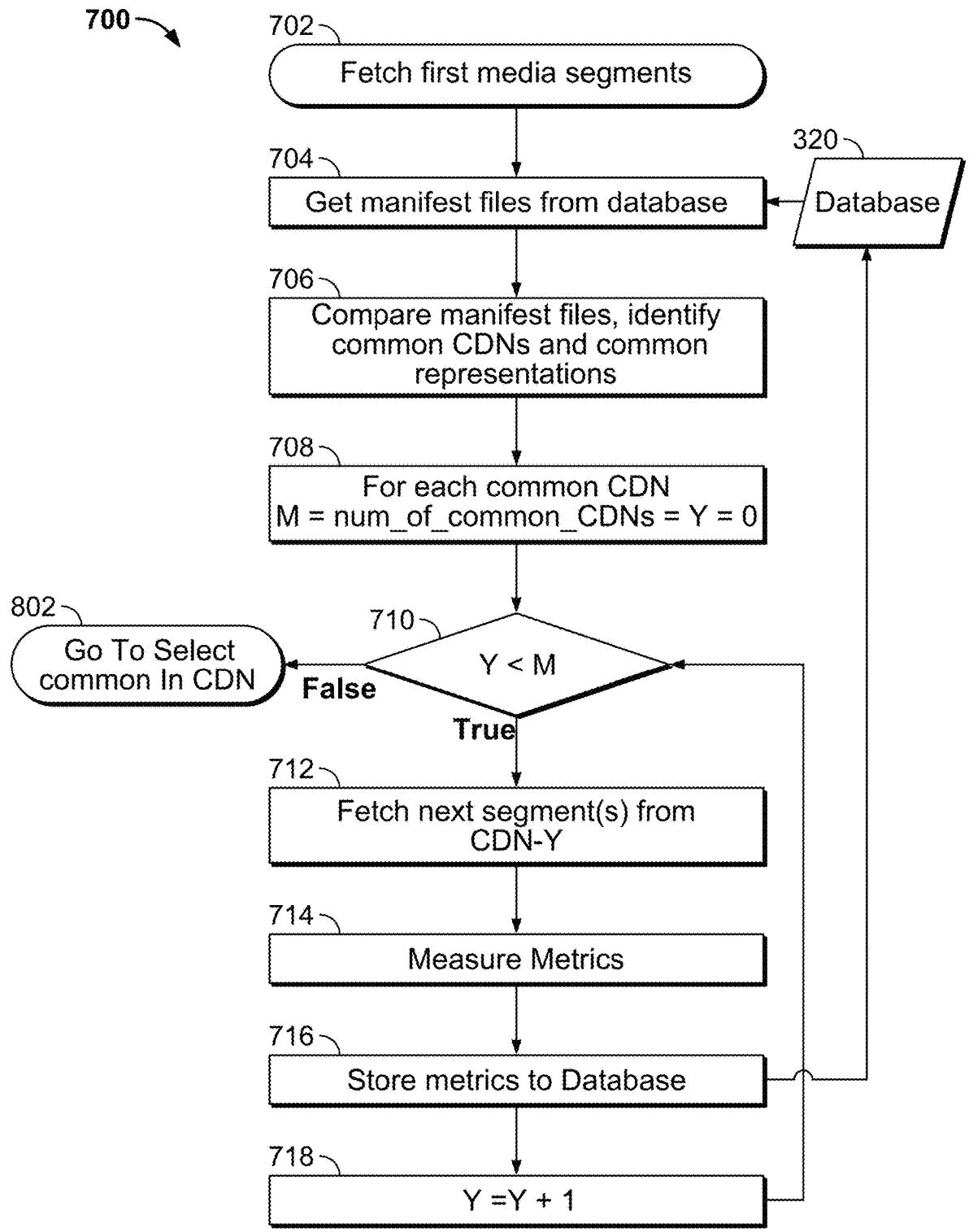
FIG. 7 shows a simplified flowchart of a method for retrieving media segments via available multi-network communication paths, in accordance with some embodiments of this disclosure.
Figure 8:
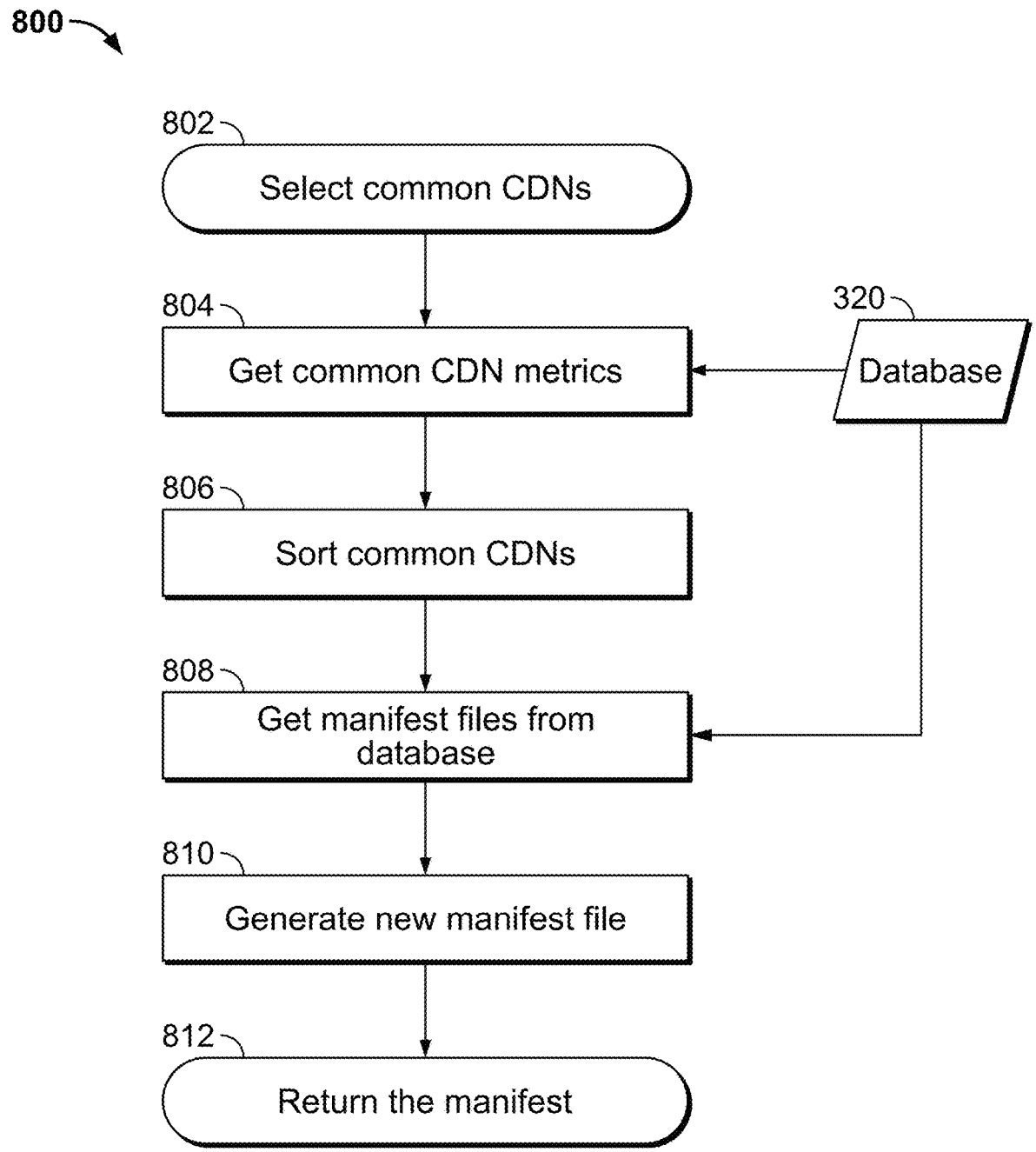
FIG. 8 shows a simplified flowchart of a method for selecting a common CDN accessible via multiple network interfaces, in accordance with some embodiments of this disclosure.
Figure 9:
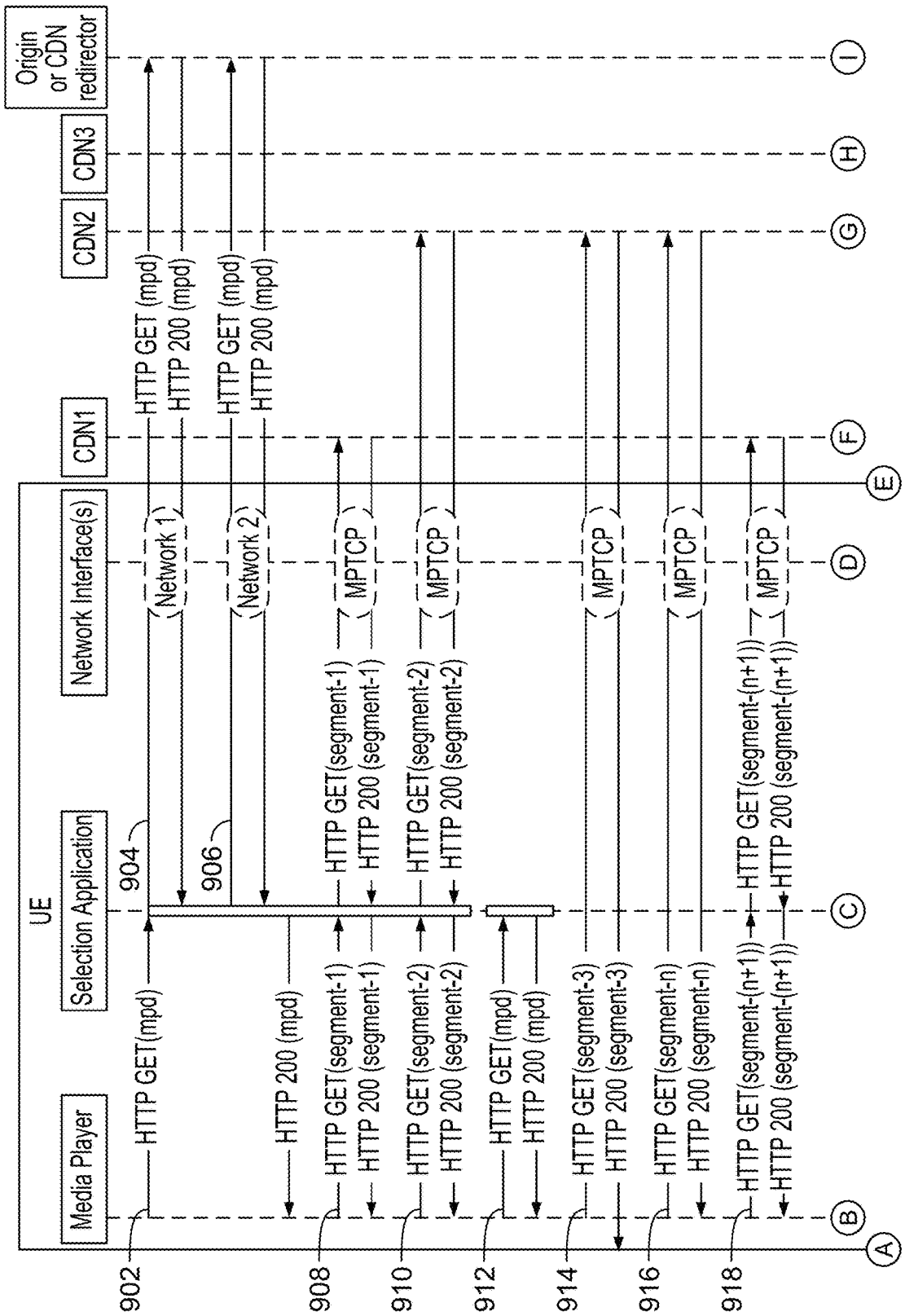
FIG. 9 shows a simplified sequence diagram illustrating steps of a second embodiment of the present disclosure.
Figure 9:
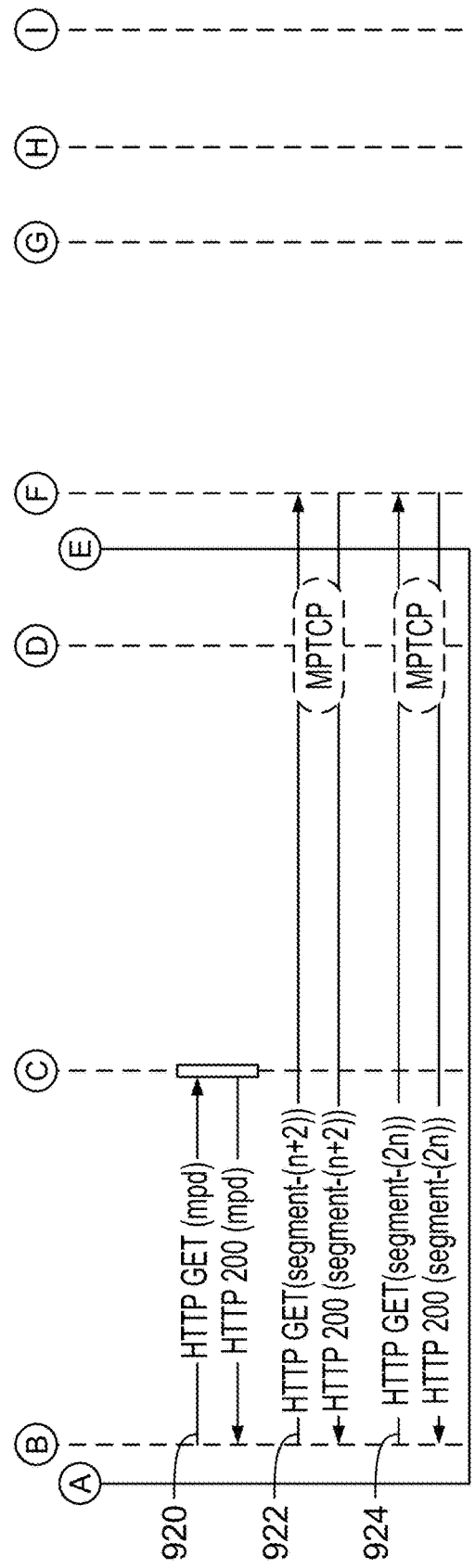

FIGS. 3-6 illustrate a first embodiment for network interface and CDN selection that does not include multipath protocols, or for which multipath protocols are disabled. FIGS. 7-9 illustrate a second embodiment for network interface and CDN selection that does include multipath protocols, or for which multipath protocols are enabled.

Figure 3:
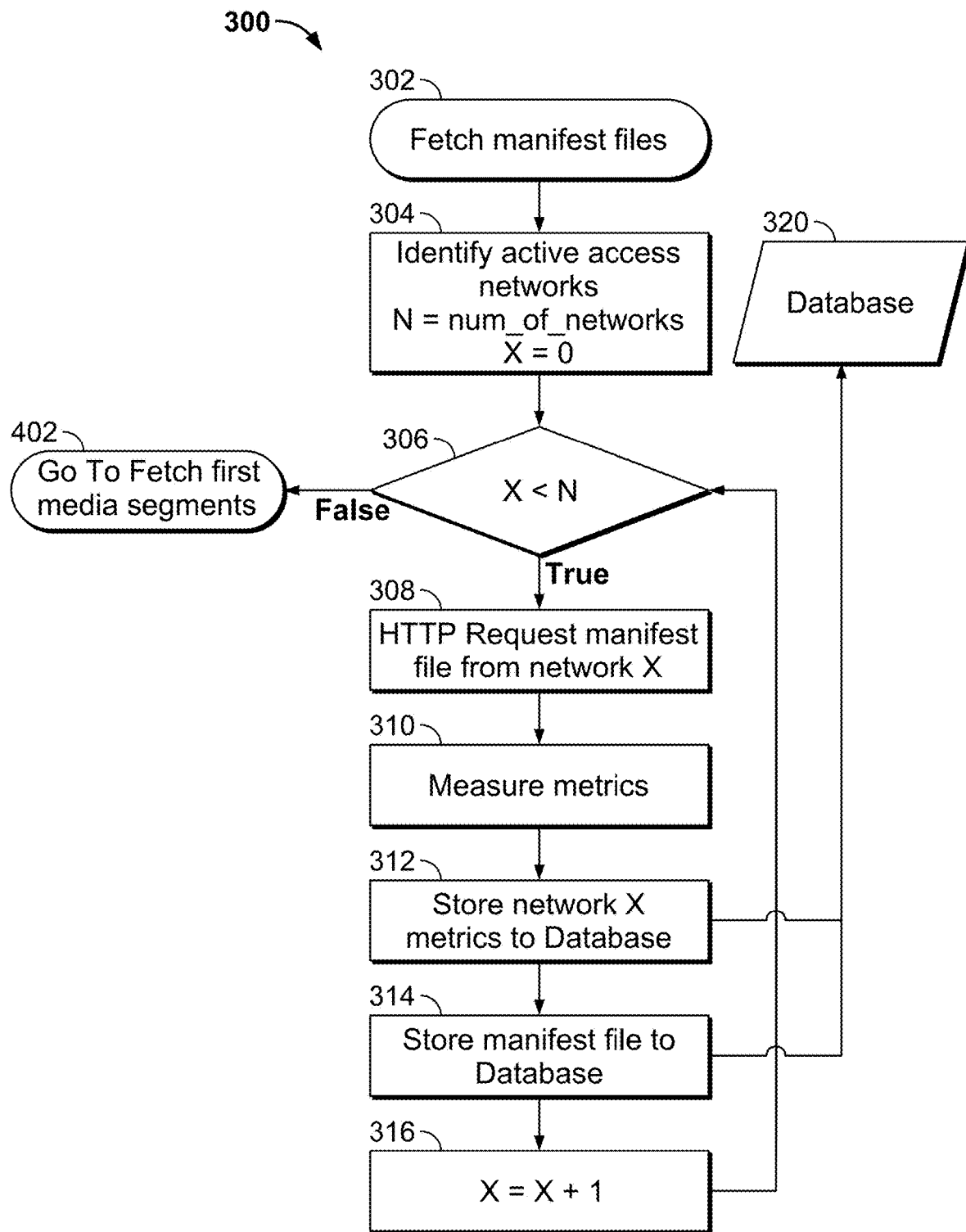
FIG. 3 shows a simplified flowchart of a method for retrieving information about available network interface/CDN pairs, in accordance with some embodiments of this disclosure.

When a user wants to watch a particular content item on their user device, the request to watch the content item begins a process of identifying a best network interface/CDN pair with which to retrieve segments of the content item. FIG. 3 shows a simplified flowchart of a method for retrieving information about available network interface/CDN pairs, in accordance with some embodiments of this disclosure. This information may be used by the user device to identify a best network interface/CDN pair, for use in retrieving segments of a content item for display to a user.

At step 302, the process for retrieving information about available CDNs begins. The user device (e.g., the media player) requests information about where to access the requested content item. The requested information may be included in a manifest, or MPD file, or in some other data structure. In FIG. 3, the requested information comprises a manifest file which stores information about the CDNs accessible via the network over which the information was requested, the segments of the requested content item, and addresses for the segments of the content item stored on the CDNs.

Step 304 includes the user device identifying the access networks available to the user device. In some examples, the user device may have access to a first network comprising a wi-fi network, accessible through wi-fi interface, and second network comprising a cellular network, accessible through cellular interface. Other networks and/or network interfaces may include a sidelink to another user device, a second cellular network interface, or any other accessible network and network interface.

Steps 306-316 are a loop that steps through each available network to analyze and store performance data for that network. At step 306, the user device determines whether all available networks have been analyzed.

At step 308, the user device makes an HTTP request for a manifest file from a first network via a first network interface.

At step 310, the user device measures performance metrics corresponding to the HTTP request for the manifest file from the first network performed at step 308.

At step 312, the user device stores the measured performance metrics corresponding to the first network to a database 320.

At step 314, the user device stores the manifest file retrieved via the first network to the database 320.

At step 316, the user device increments a counter, and proceed back to step 306. If the user device identified additional networks at step 304, (i.e., a second, third, or more), the process of steps 306-316 is repeated for each network.

Once all available networks have been identified and their respective performance metrics and manifest files have been stored in the database 320, the process 300 proceeds to step 402. At step 402, the process continues with retrieving media segments of the requested content item in order to identify a best network interface/CDN pair, discussed in further detail below with respect to FIG. 4.

Figure 4:
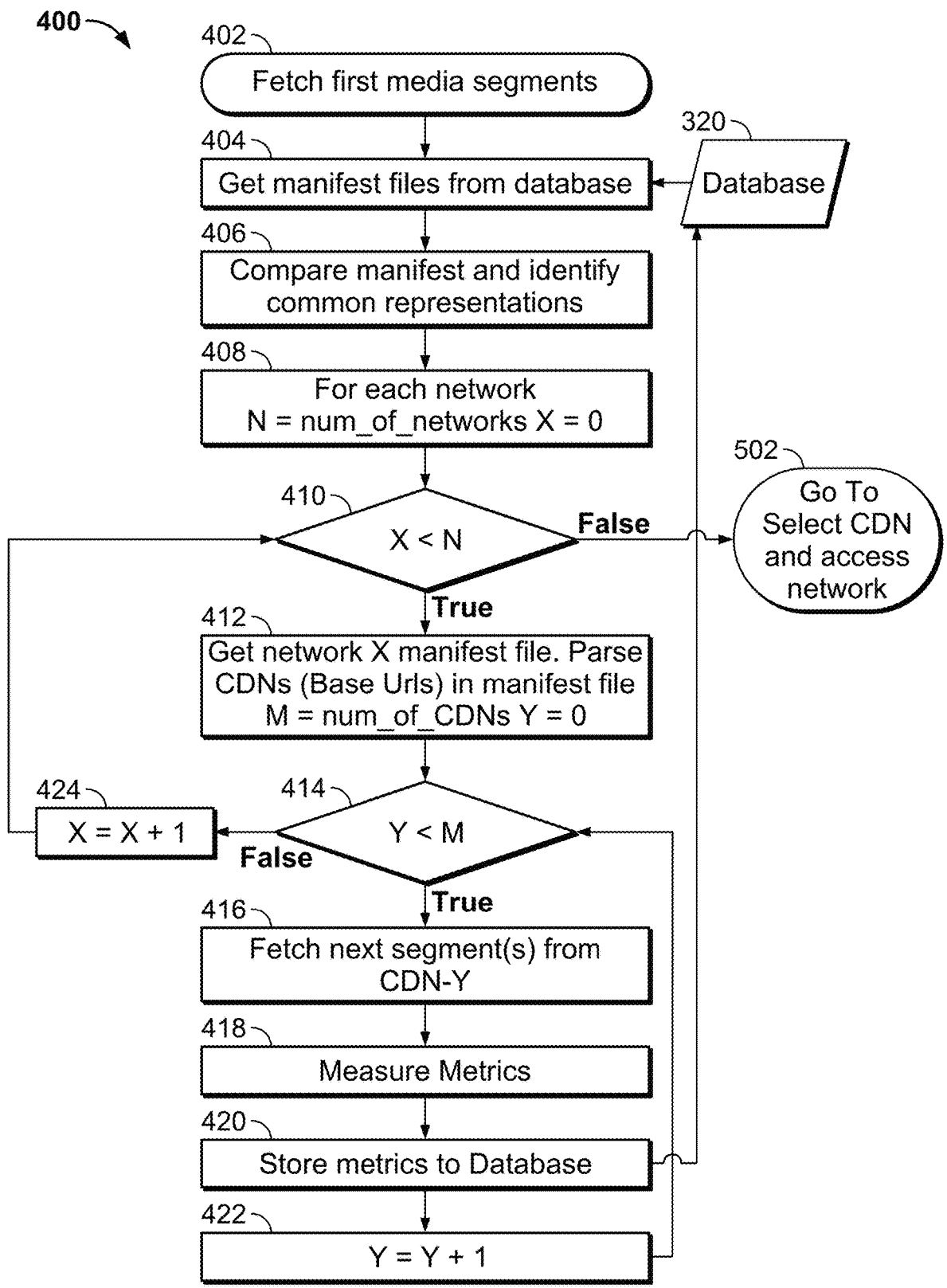
FIG. 4 shows a simplified flowchart of a method for retrieving media segments via the available network interface/CDN pairs, in accordance with some embodiments of this disclosure.

FIG. 4 shows a simplified flowchart of a method for retrieving media segments via the available network interface/CDN pairs, in accordance with some embodiments of this disclosure. Whereas FIG. 3 illustrates a process for identifying available networks and retrieving respective manifests, FIG. 4 illustrates a process for identifying and gathering performance metrics for each network interface/CDN pair. Process 400 may be understood more simply as progressing through each available network interface/CDN pair, retrieving a segment of the content item, and determining performance metrics for the current pair. The performance metrics for each pair are gathered so they can be ranked, and a best pair can be determined.

At step 402, the process 400 for fetching media segments via each network interface/CDN pair begins.

At step 404, the user device (e.g., the selection application) retrieves the manifest files stored in the database 320 during the process 300 described above. These manifest files may include information detailing where segments of the requested content item are stored, addresses for the segments in each CDN, and more.

At step 406, the selection application compares the retrieved manifest files and identifies common representations of the segments of the requested content item. Each network may have a separate manifest file, and each manifest file may list various representations (e.g., bit rates, resolutions, etc.) of the segments of the content item. These representations may be different from CDN to CDN, so the user device may compare the manifests so that only those representations which are in common between each CDN are used.

Steps 408-424 are a loop that is performed for each combination of network interface and CDN available through that network interface (i.e., each network interface/CDN pair). Steps 408-424 analyze and store performance metrics for each pair. At step 408, the selection application identifies the available network interfaces.

At step 410, the selection application determines if additional networks need to be analyzed, or whether all available networks have been analyzed. If there are still unanalyzed networks (or partially analyzed networks, wherein one or more CDNs accessible via that network have yet to be analyzed), the process proceeds to step 412.

At step 412, the selection application retrieves the manifest file corresponding to the current network or network interface, and determines all the available CDNs accessible via that network interface.

At step 414, the selection application determines whether there are any CDNs for the current network interface that have yet to be analyzed. If there are still unanalyzed CDNs for the current network, the process 400 continues at step 416.

At step 416, the selection application fetches one or more segments of the requested content item from the first CDN, via the first network (i.e., the first pair).

At step 418, the selection application measures performance metrics based on the fetched segment or segments from the first pair. The performance metrics can include, for example, throughput, response time of the first network and/or first CDN in the first pair, packet loss, latency, jitter, and signal strength.

At step 420, these measured performance metrics are stored to the database 320 for decision making.

At step 422, the selection application increments a CDN counter, and the process proceeds again to step 414. If there is a second or additional CDN accessible via the first network or network interface, steps 416, 418, 420, and 422 are repeated for each additional CDN.

Once each CDN accessible via the first network is used to retrieve one or more segments of the requested content item, and the performance metrics are stored for each pair comprising the first network interface and a respective CDN, the process proceeds to step 414 at which the selection application determines that there are no more CDNs that need to be analyzed with respect to network interface 1. The process 400 then proceeds to step 424.

At step 424, the network interface or network counter is incremented, and the process proceeds again to step 410 to determine whether any additional networks need to be analyzed. If there is an additional network to be analyzed (e.g., a second or additional network), steps 412-424 are repeated for that network. Steps 412-424 include the selection application analyzing all the network interface/CDN pairs that comprise the second network and a respective CDN. If there is a third network interface or network, the process 400 is again repeated for all network interface/CDN pairs that comprise the third network interface and a respective CDN.

With respect to the system of FIG. 2, process 400 may include first retrieving segments 1 to N from CDN 1 via the first network interface (i.e., the first pair), and measuring and storing performance metrics associated with that retrieval. The selection application would then retrieve segments N+1 to 2N from CDN 2 via the first network interface (i.e., the second pair), and measure and store performance metrics associated with that retrieval. The selection application would then retrieve segments 2N+1 to 3N from CDN 2 via the second network interface (i.e., the third pair), and measure and store performance metrics associated with that retrieval. Finally, the selection application would then retrieve segments 3N+1 to 4N from CDN 3 via the second network interface (i.e., the fourth pair), and measure and store performance metrics associated with that retrieval.

Figure 5:
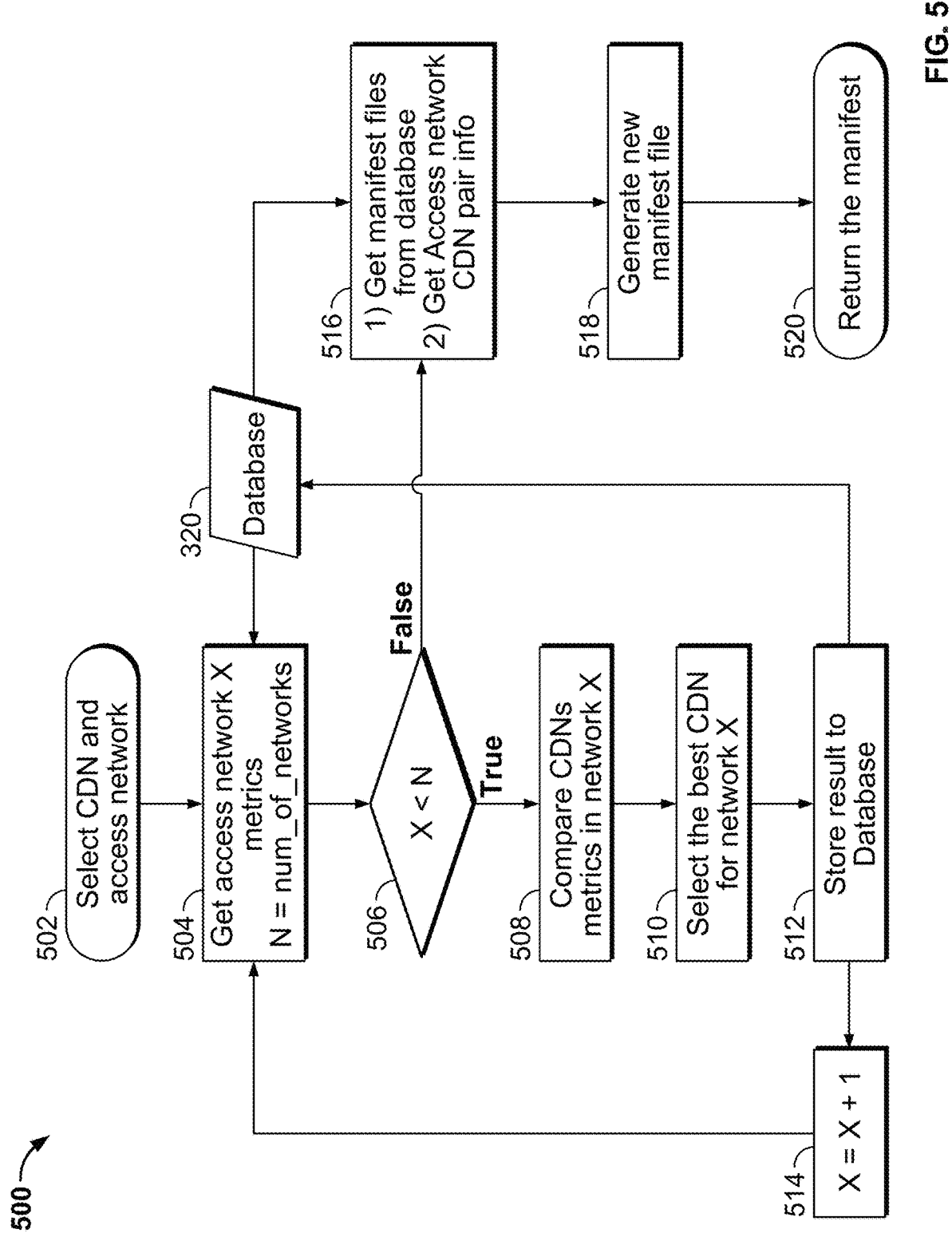
FIG. 5 shows a simplified flowchart of a method for selecting a network interface/CDN pair, in accordance with some embodiments of this disclosure.

Once every available network interface/CDN pair is analyzed and the performance metrics are stored, the process 400 proceeds to step 502 wherein the selection application selects one of the plurality of network interface/CDN pairs, discussed in further detail with respect to FIG. 5.

FIG. 5 shows a simplified flowchart of a method for selecting a network interface/CDN pair based on their respective performance metrics, in accordance with some embodiments of this disclosure. Step 502 begins the process of selecting a network interface/CDN pair.

Steps 504-514 are a loop of steps that is repeated for each of the available networks or network interfaces. Each loop determines a best CDN accessible via the network interface. At step 504, the selection application retrieves the first access network performance metrics (network X) from the database 320.

At step 506, the selection application determines whether no more networks or network interfaces need to be compared (i.e., whether the loop of steps 504-514 has been executed for each available network or network interface). If all networks or network interfaces have been analyzed, the process proceeds to step 516. However, if there are still any networks or network interfaces that have not been analyzed, the process proceeds to step 508.

At step 508, the selection application compares CDN performance metrics for all CDNs accessible via the first network interface or first network (e.g., the network interface or network currently being analyzed for the loop 504-514).

At step 510, the selection application selects the best CDN accessible via the first network interface or first network. This can include determining the best CDN based on the respective performance metrics of each CDN, as well as factoring in any policy considerations such as location, time of day, etc.

At step 512, the selection application stores the result of the best CDN determined for the first network or network interface to the database 320.

At step 514, the selection application increments the network interface or network counter, and proceeds back to step 504.

The selection application repeats steps 504-514 for each additional network. The selection application identifies and stores in the database 320 the best CDN (e.g., the CDN with the best performance metrics) for each network or network interface accessible by the user device.

Once all networks or network interfaces have been analyzed (and the best CDN for each network or network interface has been stored in the database 320) the process 500 proceeds to step 516. At step 516, the selection application retrieves the manifest files from the database 320, and identifies the best network interface/CDN pair based on the stored best CDNs for each network or network interface identified in steps 504-514. Additionally, the selection application may rank the network interface/CDN pairs to determine a best-ranked pair to be used for retrieval of subsequent segments of the content item.

At step 518, the selection application generates a new manifest file based on the identified best network interface/CDN pair. The selection application may generate the new manifest to also include information about how to access multiple networks or network interfaces/CDN pairs concurrently or simultaneously. Additionally, the selection application may generate the new manifest to include information about which CDN to switch to for segment retrieval when certain conditions are met (e.g., service degradation), the ranking of various accessible CDNs, and more.

At step 520, the selection application returns the generated new manifest to the media player, to enable the media player to request and retrieve segments of the content item. The media player may then request the next segment of the content item via the best network interface/CDN pair, according to the newly generated manifest file.

In some examples, the selection application may also be configured to control when the user device switches from one network interface/CDN pair to another for retrieval of segments of the content item. The switching may be performed in response to degradation in performance of one or more CDNs, networks, or network interfaces, due to one or more policy reasons, or for some other reason. Additionally, the selection application may switch from a first CDN accessible via a first network and first network interface to: (a) a different network interface, (b) a different network, (c) a different CDN, or (d) a combination of any of (a), (b), and (c).

That is, the selection application may switch from the first CDN, first network, and first network interface, to (a) the first CDN, first network, and a second network interface (i.e., using the same network but accessing it via a different network interface; (b) the first CDN, a second network, and the first network interface (i.e., accessing a different network via the same network interface); (c) the first CDN, a second network, and a second network interface (i.e., accessing a different network via a different network interface); (d) a second CDN, the first network, and the first network interface; (e) a second CDN, a first network, and a second network interface (i.e., using the same network but accessing it via a different network interface); and/or (f) a second CDN, a second network, and a second network interface.

Figure 6:
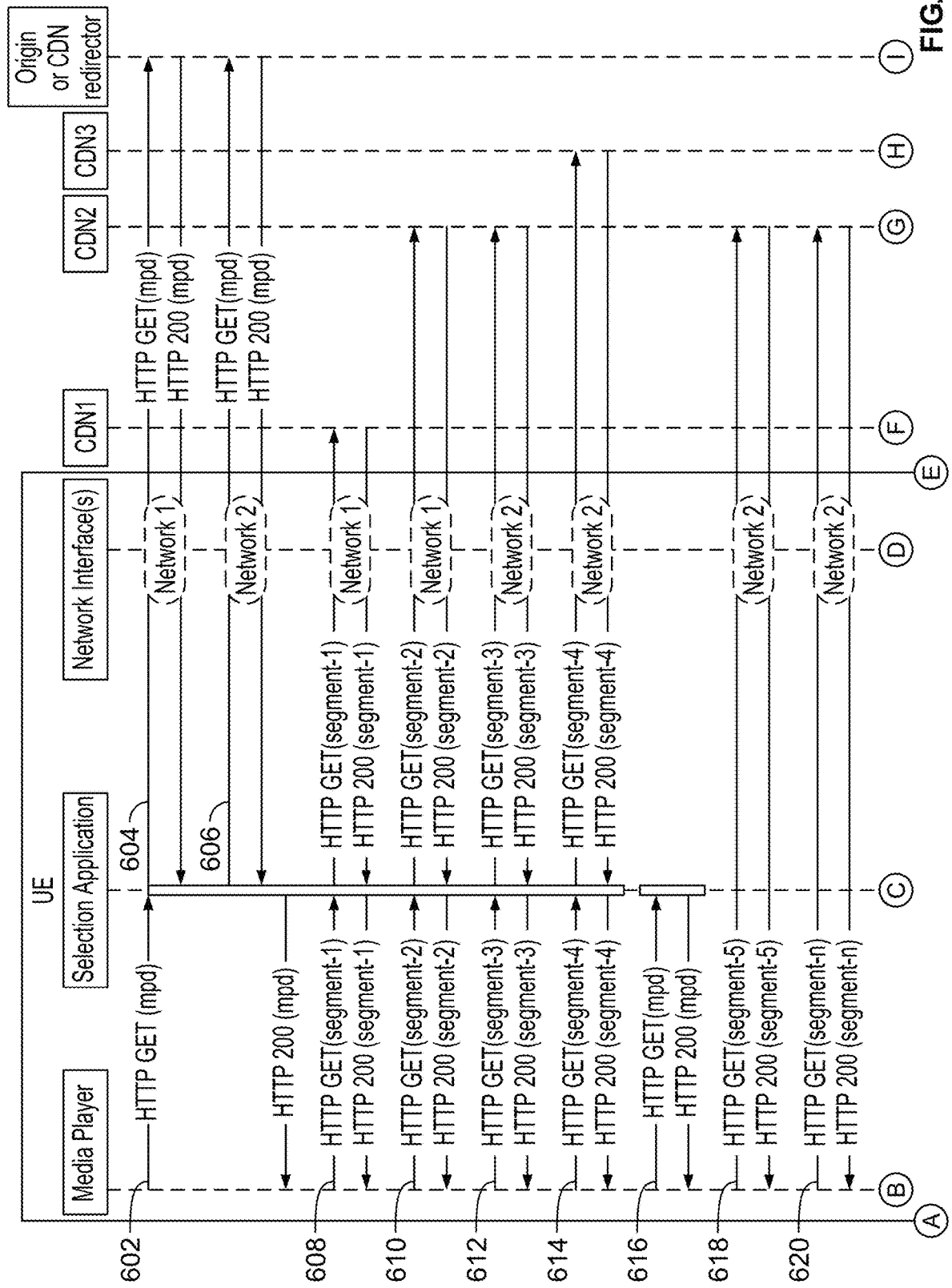
FIG. 6 shows a simplified sequence diagram illustrating steps of one embodiment of the present disclosure.
Figure 6:
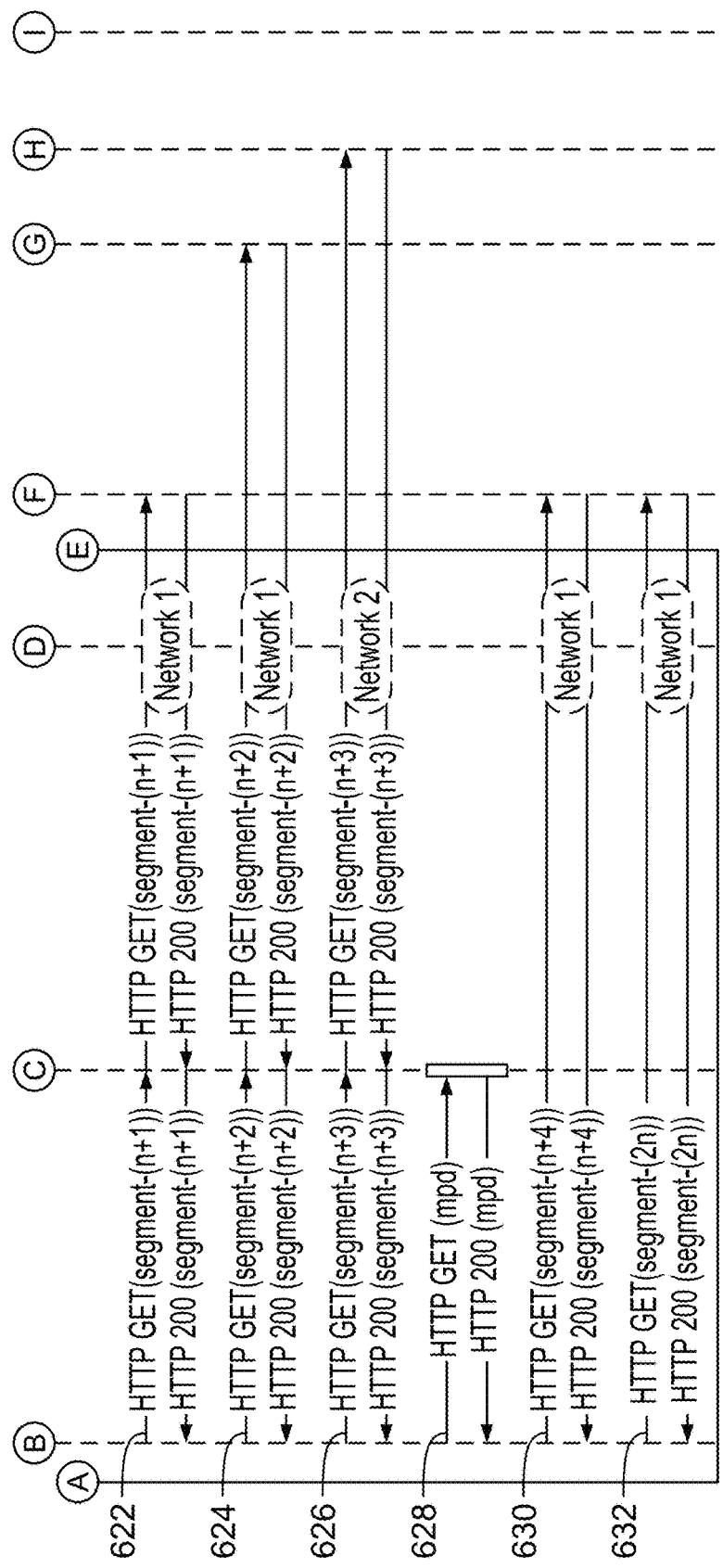

FIG. 6 shows a simplified sequence diagram illustrating steps of one embodiment of the present disclosure. The selection application may measure the performance metric information for various pairs during a streaming session, and may perform additional best-pair determinations during the streaming session either regularly (i.e., according to the minimumUpdatePeriod) or when measured performance metrics indicate that QoS or QoE are decreasing.

FIG. 6 illustrates a sequence diagram using the same system illustrated in FIG. 2, including a user device (or UE) having a media player, selection application, and one or more network interfaces. FIG. 6 illustrates a network interface layer, which may comprise two or more network interfaces (i.e., shown as network 1 and network 2 at the network interface layer in FIG. 6). Alternatively, the user device may have one network interface that enables access to two or more different networks. The illustrated system also includes three CDNs (CDN 1, CDN 2, and CDN 3), each accessible via one or more of the network interfaces. It should be appreciated that other systems may include additional network interfaces, CDNs, and/or various other devices, systems, or components.

When a user of the user device requests to watch a content item (e.g., a movie, TV show, etc.), an example sequence of how the system responds is shown in FIG. 6. At step 602, the media player of the user device requests a manifest file or MPD file from the selection application.

At steps 604 and 606, the selection application requests information from the origin server or CDN redirector via each available network interface of the user device, or via each network accessible by the user device. The origin server or CDN redirector returns the manifest files or MPD files to the selection application via the first and second networks respectively. The user device (e.g., the selection application) also measures the respective network performance metrics based on the retrieval of the manifest or MPD files via each network. The selection application then analyses the received manifest or MPD files, and rewrites or generates a new common manifest or MPD file which includes representations of the requested content item that are included in both manifest or MPD files. In addition, the selection application may add or change the minimumUpdatePeriod that may be used to determine the timing for when performance metrics for each network interface/CDN pair are determined. In some cases, the timing may be changed based on the characteristics of the requested content item (e.g., the size of the segments), the characteristics of the networks, the CDNs accessible via each network, or based on some other consideration. In one example, the minimumUpdatePeriod indicates the smallest period between potential changes to the MPD. The timing for when performance metrics for each network interface/CDN pair are determined may be based on the minimumUpdatePeriod, such as a multiple of the minimumUpdatePeriod (e.g., 4× minimumUpdatePeriod).

At steps 608, 610, 612, 614, the media player requests one segment of the requested content item from each network interface/CDN pair available to the user device. Segment 1 is retrieved from CDN 1 via network interface 1 or network 1, segment 2 is retrieved from CDN 2 via network interface 1 or network 1, segment 3 is retrieved from CDN 2 via network interface 2 or network 2, and segment 4 is retrieved from CDN 3 via network interface 2 or network 2. The performance metrics (e.g., response time, throughput, etc.) for each of these network interface/CDN pairs is gathered, and a best pair is determined based on the performance metrics.

At step 616, the media player may request a manifest file or MPD file update. The selection application may use the performance metrics determined based on steps 608-614 to determine a new manifest or MPD file, and return it to the media player. In the illustrated example, the new manifest file indicates that the media player should request the next segment(s) of the content item via network interface 2 and CDN 2 (i.e., the best network interface/CDN pair).

At steps 618-620, the media player, based on the new manifest file, requests segments 5 to N from CDN 2 via network interface 2, as indicated in the new manifest file. The selection application continues to monitor the performance of network interface 2, network 2, and CDN 2 based on the retrieval of each of segments 5 to N. The performance continues to be stored in database.

As time progresses, the system may perform an update at a regular interval. Because the media player has been retrieving segments 5 to N via network interface 2 and CDN 2 (and therefore the system has recent performance metrics for this pair), updated performance metrics for the other pairs must be obtained. Steps 622, 624, and 626 include the media player requesting segments N+1, N+2, and N+3 respectively from each of the other network interface/CDN pairs. Segment N+1 is retrieved from CDN 1 via network interface 1, segment N+2 is retrieved from CDN 2 via network interface 1, and segment N+3 is retrieved from CDN 3 via network 2. Segment N was previously retrieved from CDN 2 via network interface 2. The performance metrics (response time, throughput, etc.) for the retrieval of segments N, N+1, N+2, and N+3 are gathered, and a best pair is determined based on these performance metrics.

At step 628, the media player may request a manifest file or MPD file update. The selection application may use the performance metrics gathered at steps 620-626 to determine a new manifest file or MPD file, and return that new manifest file or MPD file to the media player. In this case, the new manifest file or MPD file indicates that the media player should request the next segment(s) of the content item via network interface 1 and CDN 1 (i.e., the best pair).

At steps 630-632, the media player, based on the new manifest file or MPD file, requests segments N+4 to 2N from CDN 1 via network interface 1, as indicated in the new manifest file or MPD file. The selection application continues to monitor the performance of network interface 1, network 1, and CDN 1 based on the retrieval of each of segments N+4 to 2N. These performance metrics continue to be stored in the database.

The process of updating the "best pair" may be repeated over time, in some cases based on the minimumUpdatePeriod. This may occur every minute, every couple or several minutes, or at a longer or shorter time scale.

As noted above, some features of the disclosure are described with respect to the network interface. It should be appreciated that the same features may also apply with respect to the networks and/or the network interface. For example, various steps described with reference to FIG. 6 include gathering performance metrics of a given network interface, and using those metrics in decision making. In some examples, rather than or in addition to determining performance metrics of the network interface, the process may include determining performance metrics of the network itself. As such, where the term "network interface" is used in this disclosure, it may be replaced with the term "network."

Additionally, in some examples, a single network interface may be used to access two or more different access networks (and the corresponding CDNs accessible via those access networks). As such, some examples may include identifying multiple network/CDN pairs that use the same network interface, but different access networks and CDNs. Selecting a best pair may include selecting a best pair comprising a network interface and a CDN, or a best pair comprising a network and a CDN. Similarly, switching between pairs can include switching between network interface/CDN pairs, or switching between network/CDN pairs (which may or may not use the same network interface).

In some examples, more than one network interface/CDN pair or network/CDN pair may be used at the same time. For example, a method may include selecting a first selected network interface/CDN pair based on the respective performance metrics of a plurality of network interface/CDN pairs. The method may also include selecting a second selected network interface/CDN pair based on the respective performance metrics of the plurality of network interface/CDN pairs. The method may further include requesting a transmission of a first segment of a content item from a CDN of the first selected network interface/CDN pair via a network interface of the first selected network interface/CDN pair, and requesting a transmission of a second segment of the content item from a CDN of the second selected network interface/CDN pair via a network interface of the second selected network interface/CDN pair, wherein at least a portion of the transmission of the first segment and the second segment occur at the same time.

FIGS. 7, 8, and 9 (along with the system of FIG. 3) illustrate a second embodiment in which the user device uses multiple networks or network interfaces that have multipath protocols enabled. The user device may include one or more modems for a plurality of telecommunication networks, and may support multipath protocols such as multipath transmission control protocol (MPTCP) or multipath quick UDP internet connections (MPQUIC). In addition, the CDNs of the system may also support multipath protocols. Multipath protocols, such as MPTCP, enable a connection to be established between two hosts, rather than between to interfaces as in standard TCP. This enables two devices to be connected via two different communication paths, which increases throughput, reliability, and can improve overall QoS and QoE.

As described in more detail above, FIG. 3 illustrates a flowchart of a method wherein the user device (i.e., the selection application) fetches manifest files from each available access network, and measures the network performance metrics such as throughput, response time, packet loss, latency, jitter, or signal strength. The user device stores the performance metrics and manifest files to the database. The database then includes manifest files and performance metrics for each available network.

FIG. 7 shows a simplified flowchart of a method for retrieving media segments via available multi-network communication paths, in accordance with some embodiments of this disclosure. The selection application identifies one or more common CDNs accessible via two or more networks or network interfaces. Each common CDN and the two or more networks or network interfaces via which the common CDN is accessible may be referred to herein as a "multi-network communication path." The selection application then fetches segments of the requested content item using each multi-network communication path.

At step 702, the process 700 begins. Process 700 may occur after process 300, described above with respect to FIG. 3, in which the selection application analyzes the active networks and stores the manifest files and performance metrics to the database 320.

At step 704, the selection application retrieves information from the database 320 (e.g., the manifest files). It should be appreciated that the retrieved information may pertain to the available networks, network interfaces, CDNs, and various other information regarding the requested content item. Additionally, the retrieved information may be in the format of a manifest file, MPD file, or any other suitable format.

At step 706, the selection application compares the retrieved information (e.g., manifest files) to determine the available networks and to identify one or more common CDNs that are accessible via two or more of the multiple networks or network interfaces, as well as the common representations of the content item segments stored on the CDNs. In the illustrated example, CDN 2 (shown in FIG. 2) is a common CDN, accessible via both network 1 and network 2.

At step 708, the selection application begins a loop of actions for each identified common CDN, to enable a best common CDN to be determined.

At step 710, the selection application determines whether any common CDNs still need to be analyzed. If there are common CDNs to be analyzed (including the first common CDN), the process 700 proceeds to step 712.

At Step 712, the selection application fetches a next segment or segments of the requested content item using the current multi-network communication path (e.g., the common CDN and the two or more networks or network interfaces via which the common CDN can be accessed). The selection application retrieves segments 1 to N using the first multi-network communication path.

At step 714, the selection application measures performance metrics of the multi-network communication path based on the segment fetched using that path. The selection application may measure throughput, response time, packet loss, latency, jitter, and/or signal strength. At step 716, the selection application stores these performance metrics in the database 320.

At step 718, the CDN counter is incremented, and the process returns back to step 710. If there are still additional common CDNs that are accessible via multiple networks or network interfaces, these additional common CDNs are analyzed by repeating steps 710-718 for each additional common CDN. For instance, a second common CDN may be analyzed by the selection application retrieving segments N+1 to 2N using multipath protocols via the multiple active networks to the second common CDN, and corresponding performance metrics may be measured and stored.

Once every common CDN is analyzed and performance metrics are stored in the database, process 700 proceeds to step 802 wherein the selection application selects a common CDN and set of two or more access networks or network interfaces (e.g., a multi-network communication path), discussed in further detail with respect to FIG. 8.

FIG. 8 shows a simplified flowchart of a method for selecting a multi-network communication path from among a plurality of multi-network communication paths, wherein each multi-network communication path comprises two or more networks or network interfaces and a CDN that is accessible via the tow or more networks or network interfaces. In this example, the selection application compares common CDN performance metrics and selects either an optimal CDN, or sorts the common CDNs in descending order from highest performing to lowest performing based on the performance metrics. The selection unit may generate a new manifest file for the media player to use, wherein the media player can deduce a common CDN where to fetch segments of the content item using multiple access networks or network interfaces using multipath protocols. The performance metrics of all common CDNs are periodically monitored and the media application may run common CDN selection process (e.g., FIG. 7) periodically.

At step 802, the process 800 begins for selecting a multi-network communication path comprising a common CDN and two or more networks or network interfaces used to access the common CDN.

At step 804, the selection application retrieves the performance metrics determined in process 700 with respect to each of the common CDNs (i.e., the performance metrics of the one or more multi-network communication paths).

At step 806, the selection application sorts or ranks the common CDNs (i.e., sorts or ranks the multi-network communication paths that include the common CDNs).

At step 808, the selection application retrieves the manifest files from the database 320, wherein the manifest files correspond to the active or available networks and network interfaces used in the multi-network communication paths.

At step 810, the selection application generates a new manifest file based on the old manifest files retrieved at step 808, and based on the ranking or sorting of the common CDNs done at step 806. The result is a new manifest file that points the media player to the optimal common CDN for retrieval of segments of the content item using the optimal multi-network communication path.

At step 812, the selection application returns the new manifest file to the media player, so the media player can request and retrieve the segments of the content item using the optimal multi-network communication path.

In some examples, the selection application may also be configured to switch from using one multi-network communication path to another. This switch may be made in response to degradation, congestion, or other decreasing performance of the current multi-network communication path. In a first example, the selection application may switch from a first multi-network communication path comprising a first CDN, a first network interface, and a second network interface to second multi-network communication path comprising a second CDN, the first network interface and the second network interface (i.e., switching to a second CDN while using the same network interfaces). In a second example, the selection application may switch from a first multi-network communication path comprising a first CDN, a first network interface, and a second network interface to a second multi-network communication path comprising a second CDN, the first network interface and a third network interface (i.e., switching to a second CDN while using one different network interface). In a third example, the selection application may switch from a first multi-network communication path comprising a first CDN, a first network interface, and a second network interface to a second multi-network communication path comprising a second CDN, a third network interface and a fourth network interface (i.e., switching to a second CDN accessible via two different network interfaces). In a fourth example, the selection application may switch from a first multi-network communication path comprising a first CDN, a first network interface, and a second network interface to a second multi-network communication path comprising the first CDN, the first network interface and a third network interface (i.e., using the same CDN but switching one network interface). And in a fifth example, the selection application may switch from a first multi-network communication path comprising a first CDN, a first network interface, and a second network interface to a second multi-network communication path comprising the first CDN, a third network interface and a fourth network interface (i.e., using the same CDN but switching both network interfaces).

FIG. 9 shows a simplified sequence diagram illustrating steps of a second embodiment of the present disclosure, an embodiment wherein multipath protocols are enabled, and multi-network communication paths are used to retrieve segments of the requested content item. The media application may measure the performance metric information during a streaming session, and it may call the CDN and access network selection during the streaming session either regularly or when measured performance metrics indicate that QoS or QoE are decreasing. If there is a dynamic change in performance metrics where a selected (i.e., best) common CDN performance degrades, then media application may switch to using a second or next best common CDN. FIG. 9 illustrates a sequence diagram for a system including a user device having a media player, selection application, and one or more network interfaces. The system may have two or more network interfaces (shown as network 1 and network 2 at the network interface layer of FIG. 9). Alternatively or additionally, one or more of the network interfaces may enable access to two or more different networks. The system also includes three CDNs-CDN 1, CDN 2, and CDN 3—each accessible via one or more of the network interfaces. The CDNs support multipath protocols. In this example, CDN 1 and CDN 2 are both accessible via networks 1 and network 2, while CDN 3 is accessible only via network 2.

When a user requests to view a content item (i.e., a movie, TV show, etc.), an example sequence of how the system responds when multipath protocols are enabled is shown in FIG. 9.

At step 902, the media player of the user device requests a manifest file or MPD file from the selection application.

At steps 904 and 906, the selection application requests information from the origin server or CDN redirector via each network. The origin server or CDN redirector returns the manifest files or MPD files to the selection application via the first and second networks respectively. The user device also measures network performance metrics based on the retrieval of the manifest or MPD files via the respective networks. The selection application then analyses the retrieved manifest or MPD files, and rewrites a common manifest or MPD file which includes the representations of the content item that are in both files, and which includes those CDNs which can be accessed via both the first network and the second network (i.e., common CDNs). In addition, the selection application may add or change the minimumUpdatePeriod. In some cases, the minimumUpdatePeriod may be changed based on the characteristics of the requested content item (e.g., the size of the segments), the characteristics of the networks, the CDNs accessible via each network, or based on some other consideration. The minimumUpdatePeriod may be related to the timing between when performance metrics for the pairs are determined, such as at a multiple of the minimumUpdatePeriod. Determining performance metrics is discussed in further detail below.

At steps 908 and 910, the media player requests a segment of the content item from each common CDN via the respective multi-network communication path. That is, segment 1 is retrieved from CDN 1 via network 1 and network 2 at the same time using multipath protocols, and segment 2 is retrieved from CDN 2 via network 1 and network 2 at the same time using multipath protocol. The performance metrics (response time, throughput, etc.) for each of these common CDNs and multi-network communication paths is gathered, and a best multi-network communication path (or common CDN) is determined based on the performance metrics.

At step 912, the media player may request an MPD file update (or manifest file update). The selection application may use the performance metrics gathered at steps 908 and 910 to determine a new manifest file or MPD file, and return it to the media player. In this case, the new manifest or MPD file indicates that the second multi-network communication path, which includes CDN 2, should be used to request the next segments of the content item.

At steps 914-916, the media player, based on the new manifest or MPD file, requests segments 3 to N from CDN 2 using the second multi-network communication path. The user device continues to monitor the performance metrics of this second multi-network communication path and CDN 2 based on the retrieval of each of segments 3 to N. The performance metrics are stored in a database for use in later decision making.

As time progresses, the system may perform an update at a regular interval. Since the system has retrieved segments 3 to N from CDN 2 via the second multi-network communication path (and therefore the system has updated performance metrics for this path), the other paths and/or common CDNs must be used to retrieve segments of the content item in order to obtain updated performance metrics. At step 918, the media player requests a segment of the content item from the other common CDN (CDN 1) via the first multi-network communication path. Segment N+1 is retrieved from CDN 1 via the first multi-network communication path. The performance metrics (response time, throughput, etc.) for the retrieval of segments N and N+1 are gathered, and a best pair between the first and second multi-network communication paths is determined.

At step 920, the media player may request a manifest or MPD file update. The selection application may use the performance metrics gathered at steps 916 and 918 to determine a new manifest or MPD file, and return it to the media player. In this case, the new manifest or MPD file indicates that the first multi-network communication path that includes CDN 1 is the best performing path, and the media player should request the next segments of the content item from common CDN 1 via the first multi-network communication path.

At steps 922-924, the media player, based on the new manifest or MPD file, requests segments N+2 to 2N from CDN 1 via the first multi-network communication path. The user device continues to monitor performance of CDN 1, and the first multi-network communication path based on the retrieval of each of segments N+2 to 2N, and the performance metrics continue to be stored in the database.

In some examples, one or more policy considerations may be used to select, rank, or weighted rank (i.e., prioritize some factor(s) over others) one or more of the CDNs, networks, network interfaces, network interface/CDN pairs, network/CDN pairs, or multi-network communication paths. These policy considerations can include, for example, (a) the location of the user device, (b) the location of one or more CDNs, (c) the owner or operator of a network or networks, (d) the time of day, week, month, or year, (e) the cost to the owner of a CDN or network, (f) the cost to the user of the user device for a given CDN or network, (g) a user selected priority between networks or CDNs (e.g., the user selects a wi-fi connection first, and a cellular connection only if the wi-fi performance is below some threshold), and more. In one example, the policy may indicate that the user prioritizes wi-fi network use over cellular network use. In another example, the policy may indicate that a cellular network should not be used except as a last resort to avoid dropping the content item stream. In still other examples, these policy considerations may operate along with the best network interface/CDN pair determination described above. For instance, the application may select a best pair that also matches with the policy considerations (e.g., a best pair that includes a wi-fi network interface, where the cellular network interface is only usable as a last resort). In yet another example, the application may select a pair that includes a CDN that is in a particular location (e.g., where the policy indicates that CDNs located in a particular geographical region should not be used or should be deprioritized, the application may select a different CDN even if it results in slightly worse performance than the deprioritized CDNs).

Figure 10:
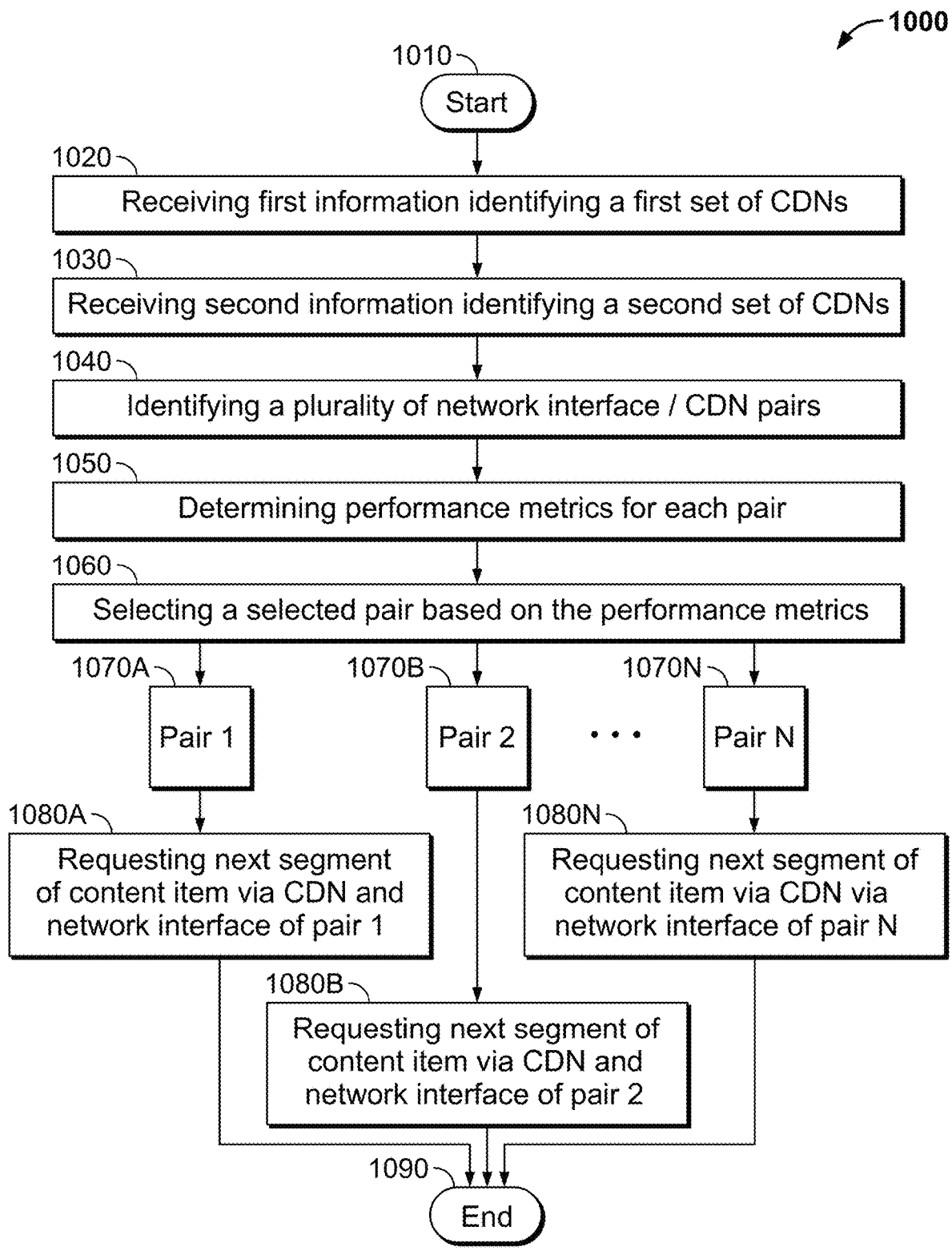
FIG. 10 is a flowchart of an illustrative process for selecting a network interface/CDN pair, in accordance with some embodiments of the present disclosure.

FIG. 10 is a flowchart of an illustrative process 1000 for selecting a network interface/CDN pair, in accordance with some embodiments of this disclosure. In various embodiments, the individual steps of process 1000 may be implemented by one or more components of the devices and systems of FIGS. 1-9 and 12. Although the present disclosure may describe certain steps of the process (and of other processes described herein) as being implemented by certain components of the devices and systems of FIGS. 1-9 and 12, this is for purposes of illustration only, and it should be understood that other components of the devices and systems of FIGS. 1-9 and 12 may implement those steps instead. Additionally, certain steps of the process 1000 are described as occurring in a particular order. However, it should be understood that the steps of process 1000 may be carried out in a different order, one or more steps may be removed, and/or one or more steps may be added.

At step 1010, the process 1000 begins. At step 1020, the selection application (via corresponding input/output circuitry) receives first information identifying a first set of CDNs, wherein each CDN of the first set of CDNs is available or accessible via a first network interface of the device, and wherein each CDN of the first set of CDNs stores segments of a content item.

At step 1030, the selection application (via corresponding input/output circuitry) receives second information identifying a second set of CDNs, wherein each CDN of the second set of CDNs is available or accessible via a second network interface of the device, and wherein each CDN of the second set of CDNs stores segments of the content item. In some examples, both the first set of CDNs and the second set of CDNs may be available via the same network interface, but via different access networks connected to the network interface. For example, a first cellular network via which a first set of CDNs are accessible, and a second cellular network via which a second set of CDNs are accessible, may both be accessible via the same network interface. Additionally, each of the first network and the second network may have one or more CDNs in common, and one or more CDNs that are not in common. It should be appreciated, however, that in some examples the term "network interface" may be used as proxy for the access network or "network" discussed herein.

At step 1040, the selection application (via corresponding control circuitry) identifies a plurality of network interface/CDN pairs based on the first and second information gathered at steps 1020 and 1030.

At step 1050, the selection application (via corresponding control circuitry) determines performance metrics for each of the identified pairs. This step can include retrieving a segment of the content item via each pair, and measuring and storing the performance metrics determined based on the retrieval of the segment.

At step 1060, the selection application (via corresponding control circuitry) selects a selected pair based on the performance metrics. This step can include selecting a pair that has the best performance metrics, and/or ranking the plurality of pairs based on the performance metrics.

At steps 1070A-1070N and 1080A-1080N, the media player (via corresponding input/output circuitry) requests the next segment or segments of the content item using the selected pair.

The process 1000 may then end at step 1090. Or alternatively, the process 1000 may proceed back to step 1020, at a timing interval which may be based on the minimumUpdatePeriod. The process 1000 may repeat at a regular interval, in order to update the best pair and enable the media player to retrieve segments of the content item using the best pair, as the best pair changes over time due to CDN outage, performance degradation, network congestion, or other issues.

Figure 11:
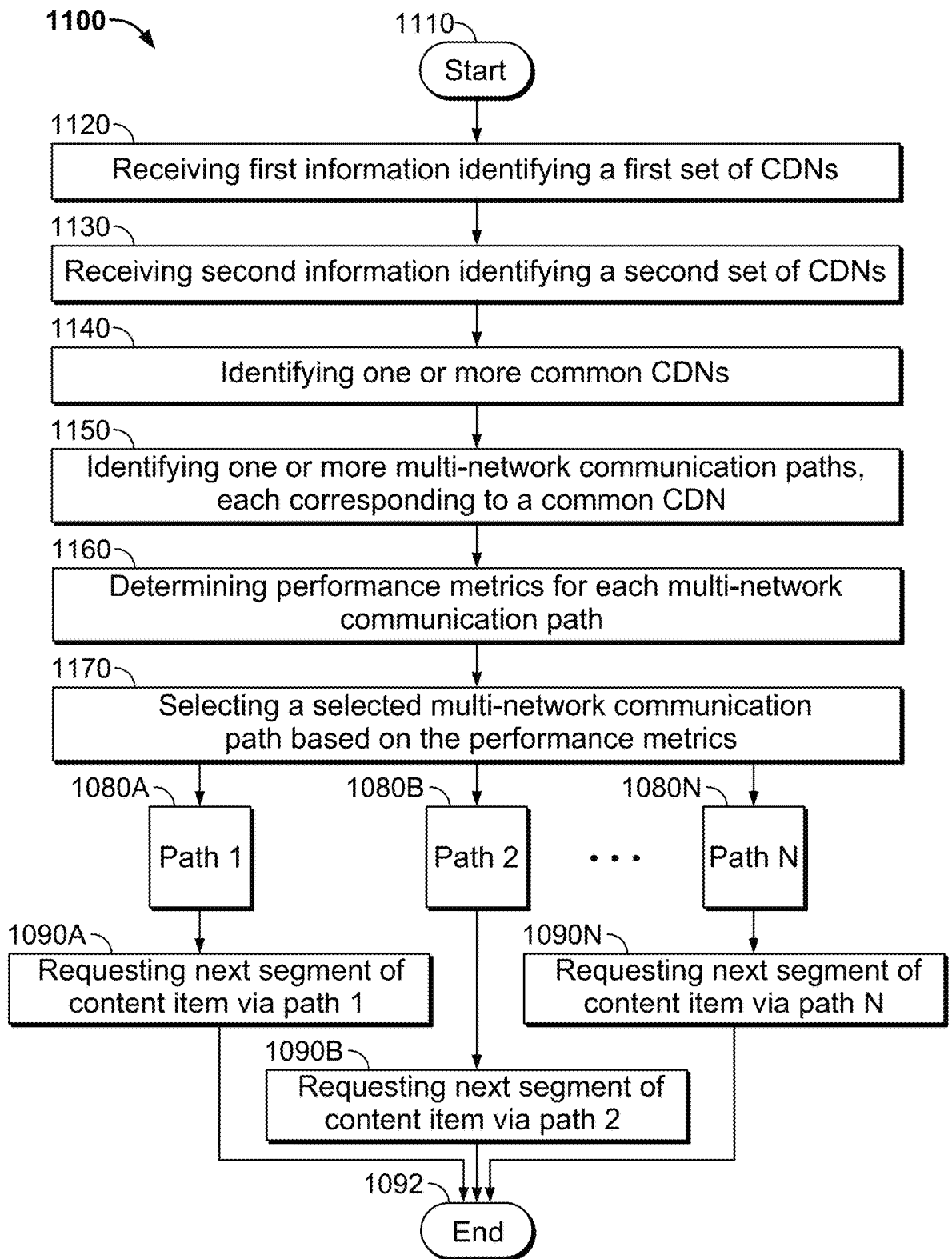
FIG. 11 is a flowchart of an illustrative process for selecting a multi-network communication path, in accordance with some embodiments of the present disclosure.

FIG. 11 is a flowchart of an illustrative process 1100 for selecting a multi-network communication path comprising a common CDN, in accordance with some embodiments of this disclosure. In various embodiments, the individual steps of process 1100 may be implemented by one or more components of the devices and systems of FIGS. 1-9 and 12. Although the present disclosure may describe certain steps of the process (and of other processes described herein) as being implemented by certain components of the devices and systems of FIGS. 1-9 and 12, this is for purposes of illustration only, and it should be understood that other components of the devices and systems of FIGS. 1-9 and 12 may implement those steps instead.

Additionally, certain steps of the process 1100 are described as occurring in a particular order. However, it should be understood that the steps of process 1100 may be carried out in a different order, one or more steps may be removed, and/or one or more steps may be added.

At step 1110, the process 1100 begins. At step 1120, the selection application (via corresponding input/output circuitry) receives first information identifying a first set of CDNs, wherein each CDN of the first set of CDNs is available or accessible via a first network interface of the device, and wherein each CDN of the first set of CDNs stores segments of a content item.

At step 1130, the selection application (via corresponding input/output circuitry) receives second information identifying a second set of CDNs, wherein each CDN of the second set of CDNs is available or accessible via a second network interface of the device, and wherein each CDN of the second set of CDNs stores segments of the content item. In some examples, both the first set of CDNs and the second set of CDNs may be available via the same network interface, but via different access networks connected to the network interface. For example, a first cellular network via which a first set of CDNs are accessible, and a second cellular network via which a second set of CDNs are accessible, may both be accessible via the same network interface. In other examples, the first and second networks (e.g., cellular networks) may be accessible using different network interfaces. Additionally, each of the first network and the second network may have one or more CDNs in common, and one or more CDNs that are not in common. It should be appreciated, however, that although certain embodiments may be understood as describing a distinction between the network and the network interface, in some examples the "network interface" may be used a proxy for the access network or network.

At step 1140, the selection application (via corresponding control circuitry) identifies one or more common CDNs that are accessible via both the first network and the second network.

At step 1150, the selection application (via corresponding control circuitry) identifies one or more multi-network communication paths, each path corresponding to one of the common CDNs.

At step 1160, the selection application (via corresponding control circuitry) determines performance metrics for each of the identified multi-network communication paths. This step can include the user device retrieving a segment of the content item via each path (from the corresponding common CDN), and measuring and storing the performance metrics determined based on the retrieval of the segment.

At step 1170, the selection application (via corresponding control circuitry) selects a selected multi-network communication path based on the performance metrics. This step can include selecting the path that has the best performance metrics, and/or ranking the plurality of paths based on the performance metrics.

At steps 1180A-1080N and 1090A-1090N, the media player (via corresponding input/output circuitry) requests the next segment or segments of the content item using the selected path.

The process 1100 may then end at step 1192. Or alternatively, the process 1100 may proceed back to step 1120, at a timing interval which may be based on the minimumUpdatePeriod. The process 1100 may repeat at a regular interval, to update the best multi-network communication path and enable the media player to retrieve segments using the best path, as the best path changes over time due to CDN outage, performance degradation, network congestion, or other issues.

The processes discussed above are intended to be illustrative and not limiting. One skilled in the art would appreciate that the steps of the process discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Figure 12:
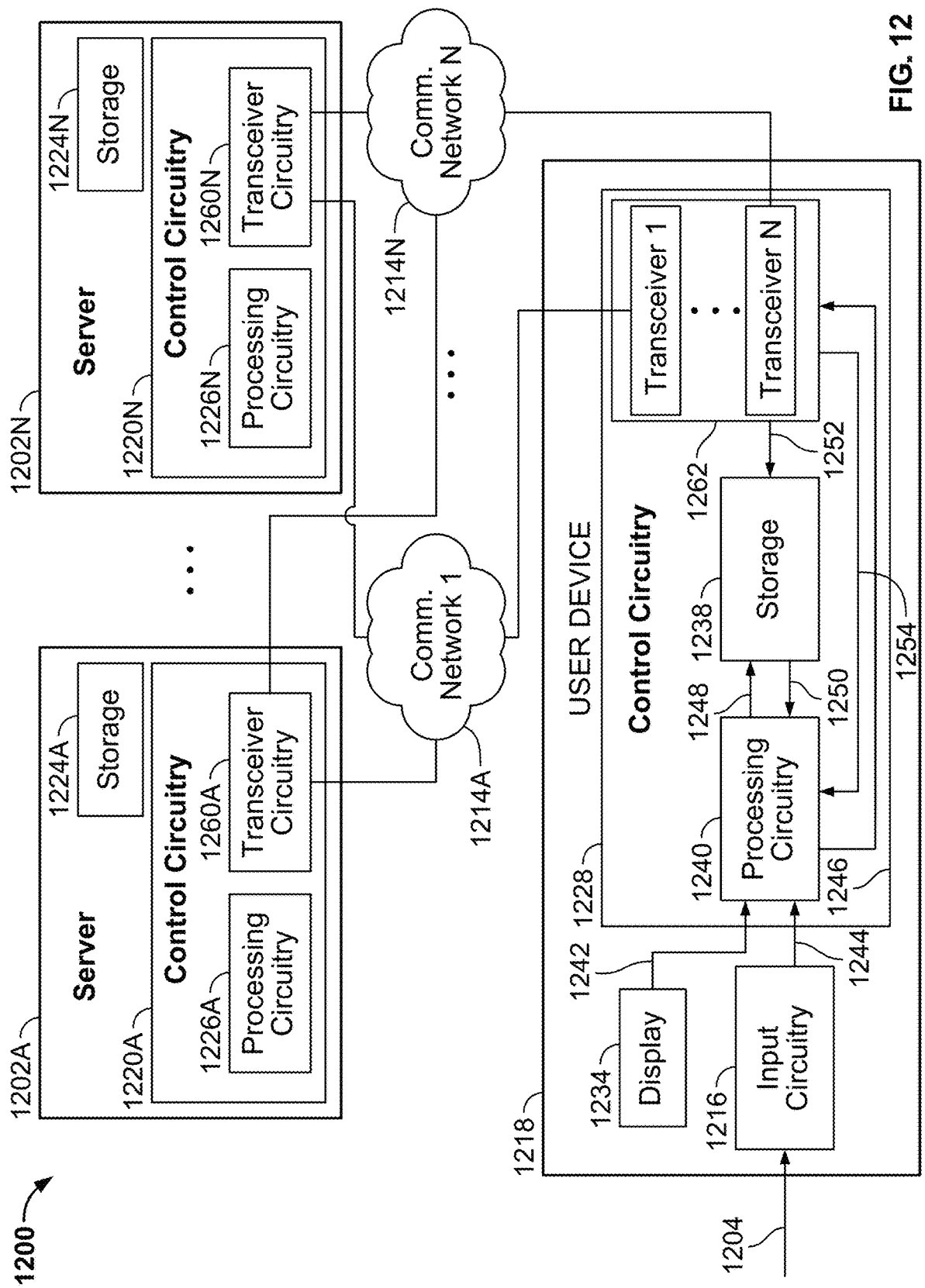
FIG. 12 is a block diagram representing devices, components of each device, and data flow therebetween for an example system, in accordance with some embodiments of this disclosure.

FIG. 12 is a block diagram representing devices, components of each device, and data flow therebetween for parts of an example system, in accordance with some embodiments of the disclosure. System 1200 is shown to include a user device 1218, servers 1202A-N(which may include one or more transceivers 1260A-N), and two or more communication networks 1214A-N. It should be appreciated that while a single instance of a component may be shown and described relative to FIG. 12, additional instances of the component may be employed. For example, one or more of servers 1202A-N may include or may be incorporated in, more than one server. Additionally, there may be two or more servers in the system, each accessible via one or more communication network (e.g., CDN 1, CDN 2, and CDN 3 accessible via network 1 and network 2 as described with respect to FIG. 2). Similarly, communication networks 1214A-N may include or may be incorporated in, more than one communication network. Servers 1202A-N are shown communicatively coupled to user device 1218 through communication networks 1214A-N. While not shown in FIG. 12, servers 1202A-N may be directly communicatively coupled to user device 1218, for example, in a system absent or bypassing communication networks 1214A-N.

In some examples, a request to stream a content item is made by a user device or a network device. For example, a user device or a network device (e.g., a laptop, PC, smartphone, smart TV, or the like) requests to view a content item from one or more CDNs, which may include one or more servers.

In some examples, the content item comprises segments that comprise an adaptive bitrate stream compatible with the MPEG-DASH standard, or other implementations such as Apple HLS. In some embodiments, the first stream of content is encoded at a first maximum bitrate and/or a first resolution. For example, the request may be a request for the next segment of an adaptive bitrate stream, and therefore the first stream of multimedia content is at a first maximum bitrate (or resolution) based on the first network bandwidth. In some examples, the second stream of multimedia content is encoded at a second maximum bitrate and/or a second resolution. For example, the request may be a request for the second segment of an adaptive bitrate stream, and therefore the second stream of multimedia content is at a second maximum bitrate (or resolution) based on new current network bandwidth, different from the first network bandwidth. The second stream may be a higher bitrate than the first stream, or vice versa, depending on the network bandwidth at the current time of the request. Accordingly, in some embodiments, each of the alternative streams comprises a plurality of bitrate variants.

In some examples, the segments of the content item are encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication networks 1214A-N may comprise one or more network systems, such as, without limitation, an internet, LAN, WIFI, or other network systems. In some embodiments, system 1200 excludes servers 1202A-N, and functionality that would otherwise be implemented by one or more of servers 1202A-N is instead implemented by other components of system 1200, such as one or more components of communication networks 1214A-N. In still other embodiments, one or more of servers 1202A-N works in conjunction with one or more components of communication networks 1214A-N to implement certain functionality described herein in a distributed or cooperative manner. Similarly, in some embodiments, system 1200 excludes user device 1218, and functionality that would otherwise be implemented by the user device 1218 is instead implemented by other components of system 1200, such as one or more components of communication networks 1214A-N or servers 1202A-N or a combination. In still other embodiments, the user device 1218 works in conjunction with one or more components of communication networks 1214A-N or servers 1202A-N to implement certain functionality described herein in a distributed or cooperative manner.

The user device 1218 includes control circuitry 1228, display 1234, and input-output circuitry 1216. Control circuitry 1228 in turn includes transceiver circuitry 1262 (which includes transceivers 1-N), storage 1238, and processing circuitry 1240. In some examples, transceivers 1-N may correspond to the network interfaces described above with respect to FIGS. 1-11. As such, each transceiver may provide access to a single communication network, or one or more transceivers may provide access to multiple communication networks.

Servers 1202A-N may comprise one or more components of a CDN described with respect to FIGS. 1-11 (e.g., CDN 1, CDN 2, and/or CDN 2). Servers 1202A-N may be similar or identical to each other, so for the sake of simplicity only server 1202A will be described in detail. Server 1202A includes control circuitry 1220A and storage 1224A. Each of the storages 1224A and 1238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1224A, 1238 may be used to store various types of content, media data, and or other types of data (e.g., they can be used to store multimedia content such as audio, video, and advertisement data). The non-volatile memory may also be used (e.g., to launch a boot-up routine and other instructions). Cloud-based storage may be used to supplement storages 1224A, 1238 or instead of storages 1224A, 1238. In some embodiments, the pre-encoded or encoded multimedia content, in accordance with the present disclosure, may be stored on one or more of storages 1224A, 1238.

In some embodiments, control circuitry 1220A and/or 1228 executes instructions for an application stored on the memory (e.g., storage 1224A and/or storage 1238). Specifically, control circuitry 1220A and/or 1228 may be instructed by the application to perform the functions discussed herein. In some implementations, any action performed by control circuitry 1220A and/or 1228 may be based on instructions received from the application. For example, the application may be implemented as software or a set of executable instructions that may be stored on storage 1224A and/or 1238 and executed by control circuitry 1220A and/or 1228. In some embodiments, the application may be a client/server application where only a client application resides on user device 1218, and a server application resides on server 1202A.

The application may be implemented using any suitable architecture. For example, it may be a stand-alone application wholly implemented on user device 1218. In such an approach, instructions for the application are stored locally (e.g., in storage 1238), and data for use by the application is downloaded periodically (e.g., from an out-of-band feed, from an internet resource, or using another suitable approach). Control circuitry 1228 may retrieve instructions for the application from storage 1238 and process the instructions to perform the functionality described herein. Based on the processed instructions, control circuitry 1228 may determine a type of action to perform in response to input received from the input/output path (or input-output circuitry) 1216 or the communication network 1214A.

In client/server-based embodiments, control circuitry 1228 may include communication circuitry suitable for communicating with an application server or CDN (e.g., server 1202A) or other networks or servers. The instructions for carrying out the functionality described herein may be stored on the application server or CDN. Communication circuitry may include a cable modem, an Ethernet card, or a wireless modem for communication with other equipment, or any other suitable communication circuitry. Such communication may involve the internet or any other suitable communication networks or paths (e.g., communication networks 1214A-N). In another example of a client/server-based application, control circuitry 1228 runs a web browser that interprets web pages provided by a remote server (e.g., server 1202A). For example, the remote server may store the instructions for the application in a storage device. The remote server may process the stored instructions using circuitry (e.g., control circuitry 1228) and/or generate displays. User device 1218 may receive the displays generated by the remote server and may display the content of the displays locally via display 1234. This way, the processing of the instructions is performed remotely (e.g., by server 1202A) while the resulting displays, such as the display windows described elsewhere herein, are provided locally on the client device 1218. Client device 1218 may receive inputs from the user via input circuitry 1216 and transmit those inputs to the remote server for processing and generating the corresponding displays. Alternatively, client device 1218 may receive inputs from the user via input circuitry 1216 and process and display the received inputs locally, by control circuitry 1228 and display 1234, respectively.

Servers 1202A-N and user device 1218 may transmit and receive content and data such as segments of content items via communication networks 1214A-N. For example, one or more of servers 1202A-N may be a media content provider or CDN, and client device 1218 may be a smart television configured to download or stream media content, such as a YouTube video, from one or more of servers 1202A-N. Control circuitry 1220A-N, 1228 may send and receive commands, requests, and other suitable data through communication networks 1214A-N using transceiver circuitry 1260A-N, 1262, respectively (also referred to as input/output circuitry). Control circuitry 1220A-N, 1228 may communicate directly with each other using transceiver circuitry 1260A-N, 1262, respectively, avoiding communication networks 1214A-N.

It is understood that user device 1218 is not limited to the embodiments and methods shown and described herein. In non-limiting examples, the user device 1218 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1220A-N and/or 1228 may be based on any suitable processing circuitry such as processing circuitry 1226A-N and/or 1240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1220A-N and/or control circuitry 1228 are configured to implement a media content operation system, such as systems, or parts thereof, that perform various media content manipulation processes described herein.

User device 1218 receives a user input 1204 at input circuitry 1216. For example, user device 1218 may receive a user input like a user swipe or user touch. In some embodiments, user device 1218 is a media device (or player), with the capability to access media content. User input 1204 may be received from a user selection-capturing interface that is separate from device 1218, such as a remote-control device, trackpad, or any other suitable user movement sensitive or capture devices, or as part of device 1218, such as a touchscreen of display 1234. Transmission of user input 1204 to user device 1218 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, 5G, or any other suitable wireless transmission protocol. Input circuitry 1216 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1240 may receive input 1204 from input circuitry 1216. Processing circuitry 1240 may convert or translate the received user input 1204 that may be in the form of gestures or movement to digital signals. In some embodiments, input circuitry 1216 performs the translation to digital signals. In some embodiments, processing circuitry 1240 (or processing circuitry 1226A-N, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
    receiving, by a device, first information identifying a first set of content delivery networks (CDNs), wherein each CDN of the first set of CDNs is available via a first network for accessing segments of a content item;
    receiving, by the device, second information identifying a second set of CDNs, wherein each CDN of the second set of CDNs is available via a second network for accessing the segments of the content item;
    identifying, based on the first information and the second information, one or more common CDNs, each common CDN being accessible via the first network and the second network;
    identifying one or more multi-network communication paths, each multi-network communication path comprising a communication path between one of the one or more common CDNs and the device via the first network and the second network;
    determining a respective performance metric for all of the each multi-network communication paths;
    selecting a selected multi-network communication path based on the respective performance metrics of the one or more multi-network communication paths; and
    requesting a transmission of a segment of the content item via the selected multi-network communication path.

2. The method of claim 1, wherein the selected multi-network communication path comprises the communication path between one of the one or more common CDNs and the device via a first network interface of the device and a second network interface of the device, wherein the first network interface and the second network interface are different.

3. The method of claim 2, wherein the first network interface comprises a wi-fi internet interface, and the second network interface comprises a cellular internet interface.

4. The method of claim 1, wherein the selected multi-network communication path comprises the communication path between one of the one or more common CDNs and the device via a first network interface, wherein the first network and the second network are both accessible by the device via the first network interface.

5. The method of claim 1, wherein the first network comprises a wi-fi internet network, and the second network comprises a cellular internet network.

6. The method of claim 1, wherein determining the respective performance metric for all of the each multi-network communication paths comprises, for each multi-network communication path:
    retrieving a second segment of the content item via the multi-network communication path; and
    determining the respective performance metric for the multi-network communication path based on the retrieval of the second segment of the content item.

7. The method of claim 1, wherein the selected multi-network communication path is a first multi-network communication path, the method further comprising:
    in response to determining that the respective performance metric of the first multi-network communication path is below a threshold level, switching to a second multi-network communication path for retrieval of additional segments of the content item.

8. The method of claim 1, further comprising, at a regular interval:
    determining a respective updated performance metric for the each respective multi-network communication path;
    selecting an updated selected multi-network communication path based on the respective updated performance metrics; and
    requesting a transmission of an additional segment of the content item via the updated selected multi-network communication path.

9. The method of claim 1, further comprising:
    selecting a first selected multi-network communication path based on the respective performance metrics of the one or more multi-network communication paths;
    selecting a second selected multi-network communication path based on the respective performance metrics of the one or more multi-network communication paths;
    requesting a transmission of a first segment of the content item via the first selected multi-network communication path; and
    requesting a transmission of a second segment of the content item via the second selected multi-network communication path,
    wherein at least a portion of the transmission of the first segment and the second segment occurs at the same time.

10. The method of claim 1, further comprising determining the first information and the second information based on a manifest file corresponding to the content item.

11. A system comprising:
input/output circuitry configured to:
receive, at a device, first information identifying a first set of content delivery networks (CDNs), wherein each CDN of the first set of CDNs is available via a first network for accessing segments of a content item; and
receive, at the device, second information identifying a second set of CDNs, wherein each CDN of the second set of CDNs is available via a second network for accessing the segments of the content item; and control circuitry configured to:
identify, based on the first information and the second information, one or more common CDNs, each common CDN being accessible via the first network and the second network;
identify one or more multi-network communication paths, each multi-network communication path comprising a communication path between one of the one or more common CDNs and the device via the first network and the second network;
determine a respective performance metric for all of the each multi-network communication paths; and
select a selected multi-network communication path based on the respective performance metrics of the one or more multi-network communication paths;
wherein the input/output circuitry is further configured to request a transmission of a segment of the content item via the selected multi-network communication path.

12. The system of claim 11, wherein the selected multi-network communication path comprises the communication path between one of the one or more common CDNs and the device via a first network interface of the device and a second network interface of the device, wherein the first network interface and the second network interface are different.

13. The system of claim 12, wherein the first network interface comprises a wi-fi internet interface, and the second network interface comprises a cellular internet interface.

14. The system of claim 11, wherein the selected multi-network communication path comprises the communication path between one of the one or more common CDNs and the device via a first network interface, wherein the first network and the second network are both accessible by the device via the first network interface.

15. The system of claim 11, wherein the first network comprises a wi-fi internet network, and the second network comprises a cellular internet network.

16. The system of claim 11, wherein the control circuitry is further configured to determine the respective performance metric for the each multi-network communication path by, for all of the each multi-network communication paths:

retrieving, via the input/output circuitry, a second segment of the content item via the multi-network communication path; and
determining the respective performance metric for the multi-network communication path based on the retrieval of the second segment of the content item.

17. The system of claim 11, wherein the selected multi-network communication path is a first multi-network communication path, and wherein the control circuitry is further configured to:
in response to determining that the respective performance metric of the first multi-network communication path is below a threshold level, switch to a second multi-network communication path for retrieval of additional segments of the content item.

18. The system of claim 11, wherein:
the control circuitry is further configured to, at a regular interval:
determine a respective updated performance metric for the each respective multi-network communication path; and
select an updated selected multi-network communication path based on the respective updated performance metrics; and
the input/output circuitry is further configured to request a transmission of an additional segment of the content item via the updated selected multi-network communication path.

19. The system of claim 11, wherein:
the control circuitry is further configured to:
select a first selected multi-network communication path based on the respective performance metrics of the one or more multi-network communication paths; and
select a second selected multi-network communication path based on the respective performance metrics of the one or more multi-network communication paths; and
the input/output circuitry is further configured to:
request a transmission of a first segment of the content item via the first selected multi-network communication path; and
request a transmission of a second segment of the content item via the second selected multi-network communication path,
wherein at least a portion of the transmission of the first segment and the second segment occurs at the same time.

20. The system of claim 11, wherein the control circuitry is further configured to determine the first information and the second information based on a manifest file corresponding to the content item.

* * * * *